US011275416B2

(12) United States Patent
Seyed et al.

(10) Patent No.: US 11,275,416 B2
(45) Date of Patent: *Mar. 15, 2022

(54) METHOD AND SYSTEM FOR INTEGRATION OF ELECTRONIC SENSORS WITH THERMAL COOLING SYSTEM

(71) Applicant: Magic Leap, Inc., Plantation, FL (US)

(72) Inventors: Shurhabeel Zamir Seyed, Coral Springs, FL (US); Carlos Julio Suate Pedroza, Miramar, FL (US); Koon Keong Shee, Miramar, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,963

(22) Filed: Jul. 1, 2020

(65) Prior Publication Data

US 2020/0333861 A1 Oct. 22, 2020

Related U.S. Application Data

(63) Continuation of application No. 16/030,523, filed on Jul. 9, 2018, now Pat. No. 10,754,399.

(Continued)

(51) Int. Cl.
*G06F 1/26* (2006.01)
*G06F 1/32* (2019.01)
(Continued)

(52) U.S. Cl.
CPC .......... *G06F 1/206* (2013.01); *G06F 1/1694* (2013.01); *G06F 1/203* (2013.01); *G06F 1/324* (2013.01);
(Continued)

(58) Field of Classification Search
CPC ...................................................... G06F 1/206
See application file for complete search history.

(56) References Cited

U.S. PATENT DOCUMENTS 8,860,818 B1 10/2014 Sachs et al.
10,165,949 B2 1/2019 Tzvieli et al.
(Continued)

FOREIGN PATENT DOCUMENTS

JP 2010032949 A 2/2010

OTHER PUBLICATIONS

EP18831334.0, "Extended European Search Report", dated Sep. 11, 2020, 20 pages.

(Continued)

*Primary Examiner* — Mohammed H Rehman
(74) *Attorney, Agent, or Firm* — Kilpatrick Townsend & Stockton LLP

(57) ABSTRACT

A system includes a computing device operatively coupled to one or more user interface components, and a thermal cooling system for cooling the computing device. The system further includes a proximity sensor positioned adjacent a thermal vent and configured to set a proximity flag in response to detecting an object in proximity to the thermal vent. The system further includes an orientation sensor coupled to the computing device and configured to set an orientation flag in response to detecting an orientation of the computing device being such that the thermal vent is facing downward. The system further includes a processor communicatively coupled to the proximity sensor, the orientation sensor, and the one or more user interface components. The processor is configured to provide an alert for output through the one or more user interface components in response to having the proximity flag set or the orientation flag set.

20 Claims, 15 Drawing Sheets

Related U.S. Application Data

(60) Provisional application No. 62/530,591, filed on Jul. 10, 2017.

(51) Int. Cl.
*G06F 1/20* (2006.01)
*G08B 21/02* (2006.01)
*G06F 1/324* (2019.01)
*G06F 1/16* (2006.01)
*G06F 3/01* (2006.01)
*G06F 3/0346* (2013.01)

(52) U.S. Cl.
CPC .............. *G06F 3/011* (2013.01); *G08B 21/02* (2013.01); *G06F 1/163* (2013.01); *G06F 3/0346* (2013.01); *G06F 2200/201* (2013.01)

(56) References Cited

U.S. PATENT DOCUMENTS

| | | |
|---|---|---|
| 10,754,399 B2 | 8/2020 | Seyed et al. |
| 2002/0121098 A1 | 9/2002 | Baker, III |
| 2007/0103321 A1* | 5/2007 | Yen .......................... G06F 1/203 340/608 |
| 2011/0178642 A1 | 7/2011 | Fujii |
| 2011/0250928 A1 | 10/2011 | Schlub et al. |
| 2012/0130545 A1 | 5/2012 | Haugh et al. |
| 2012/0182687 A1* | 7/2012 | Dighde .................... G06F 1/206 361/692 |
| 2012/0194418 A1 | 8/2012 | Osterhout et al. |
| 2012/0241140 A1* | 9/2012 | MacDonald ............ G06F 1/206 165/278 |
| 2013/0081779 A1 | 4/2013 | Liao et al. |
| 2013/0158721 A1 | 6/2013 | Somasundaram et al. |
| 2014/0191873 A1 | 7/2014 | Kreiner et al. |
| 2015/0006937 A1 | 1/2015 | Rotem et al. |
| 2016/0164563 A1 | 6/2016 | Khawand et al. |
| 2016/0212879 A1 | 7/2016 | Nikkhoo et al. |
| 2016/0327799 A1 | 11/2016 | Hoellwarth |
| 2017/0180613 A1* | 6/2017 | Dobashi .................. G02B 5/208 |
| 2017/0184863 A1 | 6/2017 | Balachandreswaran et al. |
| 2018/0025229 A1* | 1/2018 | Ding ....................... G06F 3/147 348/143 |

OTHER PUBLICATIONS

EP18831334.0, "Partial Supplementary European Search Report", dated Jun. 8, 2020, 20 pages.

PCT/US2018/041289, "International Preliminary Report on Patentability", dated Jan. 23, 2020, 16 pages.

PCT/US2018/041289, "International Search Report and Written Opinion Received", dated Sep. 24, 2018, 17 pages.

* cited by examiner

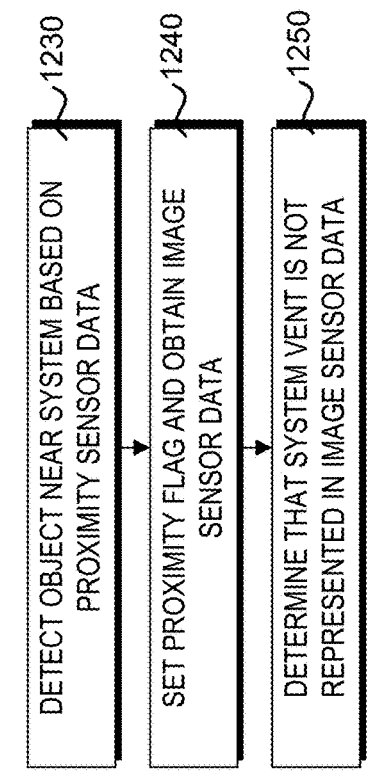
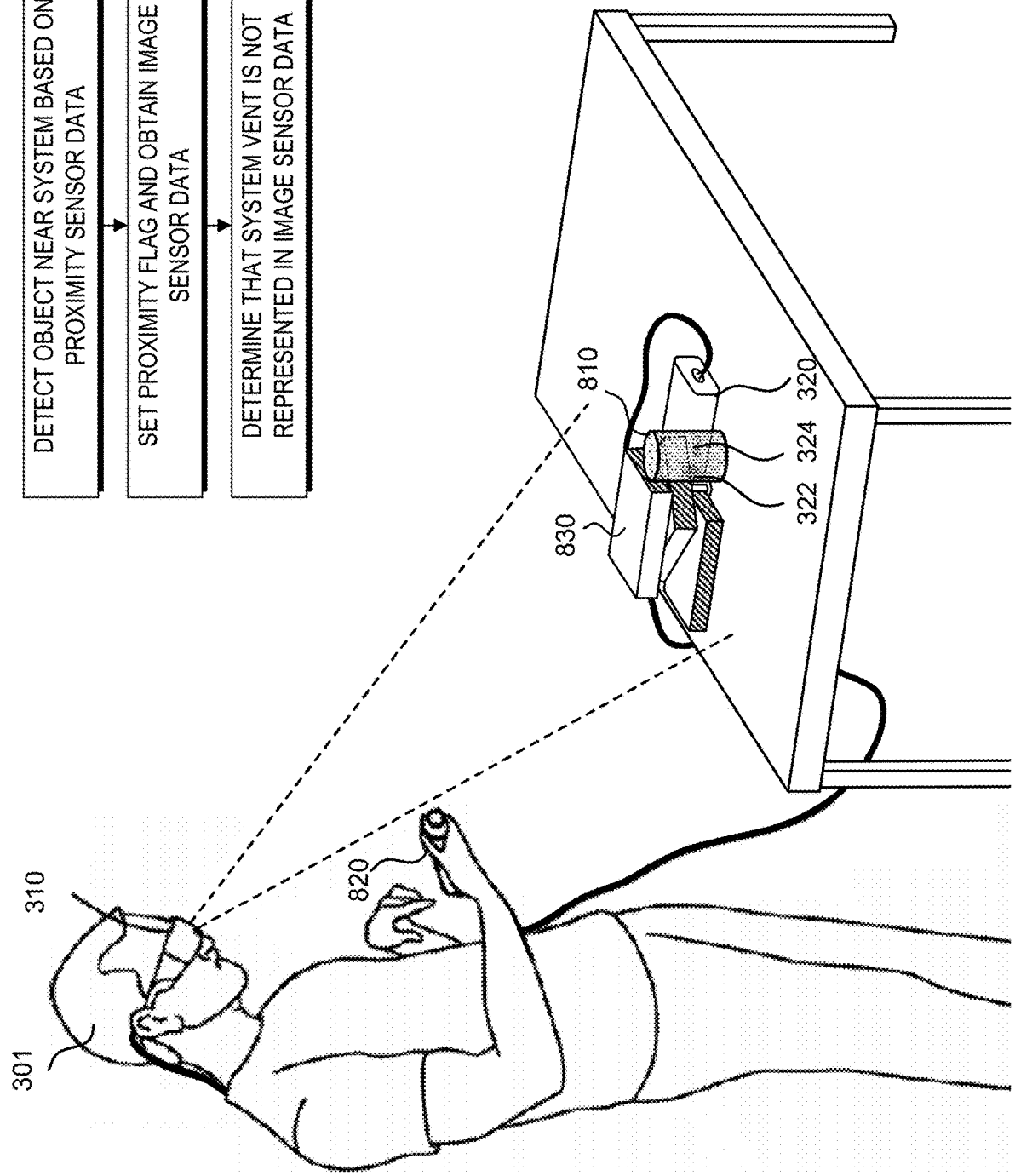
FIG.12

METHOD AND SYSTEM FOR INTEGRATION OF ELECTRONIC SENSORS WITH THERMAL COOLING SYSTEM

CROSS-REFERENCES TO RELATED APPLICATIONS

This application is a continuation of U.S. patent application Ser. No. 16/030,523, filed on Jul. 9, 2018, U.S. Pat. No. 10,754,399, issued on Aug. 25, 2020, which claims the benefit of U.S. Provisional Patent Application No. 62/530,591, filed on Jul. 10, 2017, the contents of which are incorporated by reference in their entireties.

BACKGROUND OF THE INVENTION

In an electronics system, heat may be generated as a consequence of the circuits in the electronics system having finite electrical resistance. In a computing device, significant heat can be generated by its central processing units (CPUs) and graphical processing units (GPUs). The heat being generated may relate to the amount of processing power being used. As the temperature of the computing device rises above certain threshold, it may be necessary to scale down the operating frequencies of the computing device (referred to as "throttling") to reduce power consumption, which can degrade user experience. In extreme cases, if the temperature rises above a safety threshold temperature, it may be necessary to shut down the computing device.

For a portable computing device that can come in contact with a human body (e.g., when the device is hand-held, body worn, or placed on the lap), the heat generated by the computing device can also cause the surface temperature of the computing device to rise above a comfort threshold temperature, or in worse cases above a safety threshold temperature. For example, the UL/IEC/EN-60950 thermal safety requirements dictate that the surface temperature of a user device does not exceed 55° C.-75° C. based on the type of material used for 8 hours or more of continuous use. The comfort threshold temperature can range from 40° C. to 50° C. for user devices with metal housings.

For these reasons, it is often desirable to have an efficient thermal cooling system for a computing device.

SUMMARY OF THE INVENTION

Embodiments of the present invention relate to electronic systems. More particularly, embodiments of the present invention provide methods and systems for improving the thermal cooling system efficiency of an electronic device including one or more electronic sensors. In the embodiments described herein, the one or more electronic sensors can operate either alone or in combination with each other.

According to some embodiments of the present invention, a system includes a computing device operatively coupled to one or more user interface components, and a thermal cooling system for cooling the computing device. The thermal cooling system includes at least one thermal vent. The system further includes a proximity sensor positioned adjacent the at least one thermal vent and configured to set a proximity flag in response to detecting an object in proximity to the at least one thermal vent. The system may further include an orientation sensor coupled to the computing device and configured to set an orientation flag in response to detecting an orientation of the computing device being such that the at least one thermal vent is facing downward. The system further includes a processor communicatively coupled to the proximity sensor, the orientation sensor, and the one or more user interface components. The processor may be configured to provide an alert for output through the one or more user interface components in response to having the proximity flag set or the orientation flag set.

According to some other embodiments of the present invention, a method includes detecting a condition indicating at least one of (i) an object is in proximity to a thermal vent of a cooling system of a computing device using a proximity sensor positioned adjacent the thermal vent, or (ii) an orientation of the computing device is such that the thermal vent is facing downward using an orientation sensor coupled to the computing device. The method further includes outputting an alert through one or more user interface components in response to detecting the condition.

According to some further embodiments of the present invention, a method includes detecting a condition indicating at least one of (i) an object is in proximity to a thermal vent of a cooling system of a computing device using a proximity sensor positioned adjacent the thermal vent, or (ii) an orientation of the computing device is such that the thermal vent is facing downward using an orientation sensor coupled to the computing device. The method further includes acquiring an image of the computing device using an image sensor in response to detecting the condition, and processing the image to confirm that the thermal vent is blocked or is facing downward. The method further includes outputting an alert through a user interface indicating that the thermal vent is identified as being blocked or facing downward.

According to some embodiments of the present invention, a method includes obtaining output from one or more sources of data indicative of one or more conditions of an electronic device or an environment within which the electronic device is located, and identifying, based on output data obtained from the one or more sources, the electronic device's position or orientation within the environment as being that in which the electronic device is prone to overheating. The method further includes, in response to identifying the electronic device's position or orientation within the environment as being that in which the electronic device is prone to overheating, controlling one or more user interface components to output an alert corresponding to the identified position or orientation. In some cases, the electronic device is a computing device including one or more processors. In some cases, obtaining output from one or more sources may include obtaining, by the computing device, output from one or more sources of data indicative of one or more conditions of the computing device or the environment within which the computing device is located. Identifying, based on output data obtained from the one or more sources, the electronic device's position or orientation within the environment as being that in which the electronic device is prone to overheating may include identifying, by the computing device based at least in part on output data obtained from the one or more sources, the computing device's position or orientation within the environment as being that in which the computing device is prone to overheating. Controlling one or more user interface components to output the alert corresponding to the identified position or orientation may include controlling, by the computing device, one or more user interface components to output an alert corresponding to the identified position or orientation. In some cases, controlling, by the computing device, one or more user interface components to output the alert corresponding to the identified position or orientation may include sending, by the computing device to a user device that includes one or more user interface components and is located external to the computing device, a command for the user device to output an alert through the one or more user interface components of the user device. In some cases, the computing device may include one or more user interface components, and controlling, by the computing device, one or more user interface components to output the alert corresponding to the identified position or orientation may include controlling, by the computing device, the one or more user interface components of the computing device to output an alert corresponding to the identified position or orientation. In some cases, the computing device may include one or more sensors that are each configured to monitor one or more conditions of the computing device or the environment within which the computing device is located, and obtaining output from one or more sources may include obtaining data indicating output from the one or more sensors of the computing device that are configured to monitor one or more conditions of the computing device or the environment within which the computing device is located. In some cases, the computing device may include two or more ventilation ports and a thermal management system that is configured to move air into and out of the computing device through the two or more ventilation ports. In some cases, the one or more sensors of the computing device may include a proximity sensor that is configured to monitor the computing device's proximity to physical objects located within the environment of the computing device, and obtaining data indicating output from the one or more sensors of the computing device that are configured to monitor one or more conditions of the computing device or the environment within which the computing device is located may include obtaining data representative of one or more measurements having been taken by the proximity sensor. In some cases, the method may further include determining that the obtained data representative of one or more measurements having been taken by the proximity sensor indicates that an exterior portion of the computing device within which at least one of the two or more ventilation ports is exposed is closer than a threshold distance away from one or more physical objects located within the environment of the computing device. The threshold distance may be about 0.5 mm, 1 mm, 2 mm, 3 mm, 4 mm, 5 mm, or 10 mm according to various embodiments. Identifying the computing device's position or orientation within the environment as being that in which the computing device is prone to overheating may include, in response to determining that the obtained data indicates that the exterior portion of the computing device within which at least one of the two or more ventilation ports is exposed is closer than the threshold distance away from one or more physical objects located within the environment of the computing device, identifying the computing device's position within the environment as being that in which air flow through at least one of the two or more ventilation ports of the computing device is impeded. In some cases, the one or more sensors of the computing device may include an orientation sensor that is configured to monitor the computing device's angular orientation with respect to the environment within which the computing device is located, and obtaining data indicating output from the one or more sensors of the computing device that are configured to monitor one or more conditions of the computing device or the environment within which the computing device is located may include obtaining data representative of one or more measurements having been taken by the orientation sensor. In some cases, the method may further include determining that the obtained data representative of one or more measurements having been taken by the orientation sensor indicates that an exterior portion of the computing device within which at least one of the two or more ventilation ports is exposed is facing downward. Identifying the computing device's position or orientation within the environment as being that in which the computing device is prone to overheating may include, in response to determining that the obtained data indicates that the exterior portion of the computing device within which at least one of the two or more ventilation ports is exposed is facing downward, identifying the computing device's orientation within the environment as being that in which air flow through at least one of the two or more ventilation ports of the computing device is impeded. In some cases, the one or more sensors of the computing device may include one or more temperature sensors that are each configured to monitor one or more thermal conditions of the computing device or the environment within which the computing device is located, and obtaining data indicating output from the one or more sensors of the computing device that are configured to monitor one or more conditions of the computing device or the environment within which the computing device is located may include obtaining data representative of one or more measurements having been taken by the one or more temperature sensors. In some cases, the method may further include, in response to identifying the computing device's position or orientation within the environment as being that in which the computing device is prone to overheating, obtaining data indicating output from another sensor different from the one or more sensors of the computing device. In some cases, the method may further include using the obtained data indicating output from the other sensor to verify that the computing device's position or orientation within the environment is to be identified as being that in which the computing device is prone to overheating. Controlling one or more user interface components to output the alert corresponding to the identified position or orientation may include, in response to verifying the identification of the computing device's position or orientation within the environment as being that in which the computing device is prone to overheating, controlling one or more user interface components to output an alert corresponding to the identified position or orientation. In some cases, obtaining data indicating output from the other sensor may include obtaining imaging data representative of one or more images having been captured by an imaging sensor located within the environment of the computing device. In some cases, obtaining output from one or more sources may include receiving, over a network, data from one or more services pertaining to current or predicted weather conditions of a geographic region associated with the electronic device. In some case, obtaining output from one or more sources may include obtaining, by a computing device different from the electronic device, output from one or more sources of data indicative of one or more conditions of the computing device or the environment within which the computing device is located, identifying, based on output data obtained from the one or more sources, the electronic device's position or orientation within the environment as being that in which the electronic device is prone to overheating comprises identifying, by the computing device based at least in part on output data obtained from the one or more sources, the electronic device's position or orientation within the environment as being that in which the electronic device is prone to overheating, and controlling one or more user interface components to output the alert corresponding to the identified position or orientation comprises controlling, by the computing device, one or more user interface components to output an alert corresponding to the identified position or orientation.

According to some other embodiments of the present invention, a computing system includes a physical housing structure, a thermal cooling system including at least one thermal vent for dissipating heat away from the physical housing structure, at least one sensor configured to monitor one or more operating conditions of the thermal cooling system, a plurality of electronic hardware components, at least a portion of which are contained within or attached to the physical housing structure. The plurality of electronic hardware components may include at least one user interface component, and at least one processor communicatively coupled to the at least one sensor and the at least one user interface component. The at least one processor may be configured to obtain output data from the at least one sensor, determine whether output data obtained from the at least one sensor indicates that the thermal cooling system is subject to one or more operating conditions that impede the dissipation of heat away from the physical housing structure, and provide one or more alerts for output through the at least one user interface component in response to determining that output data obtained from the at least one sensor indicates that the thermal cooling system is subject to one or more operating conditions that impede the dissipation of heat away from the physical housing structure. In some cases, the at least one sensor configured to monitor one or more operating conditions of the thermal cooling system may include a proximity sensor configured to monitor the at least one thermal vent's proximity to physical objects located external from the physical housing structure. In some cases, the at least one processor is configured to obtain data representative of one or more measurements taken by the proximity sensor, determine whether the data representative of one or more measurements taken by the proximity sensor indicates that the at least one thermal vent is closer than a threshold distance away from one or more physical objects, and provide one or more alerts for output through the at least one user interface component in response to determining that the data representative of one or more measurements taken by the proximity sensor indicates that the at least one thermal vent is closer than the threshold distance away from one or more physical objects. In some cases, the at least one sensor configured to monitor one or more operating conditions of the thermal cooling system may include an orientation sensor configured to monitor the at least one thermal vent's orientation relative to an environment within which the thermal cooling system is located. In some cases, the at least one processor is configured to obtain data representative of one or more measurements taken by the orientation sensor, determine whether the data representative of one or more measurements taken by the orientation sensor indicates that the at least one thermal vent is facing downward, and provide one or more alerts for output through the at least one user interface component in response to determining that the data representative of one or more measurements taken by the orientation sensor indicates that the at least one thermal vent is facing downward. In some cases, the at least one processor does not belong to the portion of the plurality of electronic hardware components that are contained within or attached to the physical housing structure. In some cases, the plurality of electronic hardware components may further include another processor different from the at least one processor communicatively coupled to the at least one sensor and the at least one user interface component. In some cases, the other, different processor belongs to the portion of the plurality of electronic hardware components that are contained within or attached to the physical housing structure. In some cases, the at least one user interface component does not belong to the portion of the plurality of electronic hardware components that are contained within or attached to the physical housing structure. In some cases, the at least one processor is communicatively coupled to the at least one sensor through a channel of a wireless communication network. In some cases, the at least one processor is communicatively coupled to the at least one user interface component through the channel of the wireless communication network. In some cases, the at least one processor is communicatively coupled to the at least one user interface component through another, different channel of the wireless communication network. In some cases, the at least one processor belongs to the portion of the plurality of electronic hardware components that are contained within or attached to the physical housing structure. In some cases, the at least one user interface component does not belong to the portion of the plurality of electronic hardware components that are contained within or attached to the physical housing structure. In some cases, the at least one user interface component belongs to the portion of the plurality of electronic hardware components that are contained within or attached to the physical housing structure. In some cases, the physical housing structure and the portion of the plurality of electronic hardware components that are contained within or attached to the physical housing structure collectively function as an electronic device. In some cases, at least one of the plurality of electronic hardware components not belonging to the portion of the plurality of electronic hardware components that are contained within or attached to the physical housing structure functions as part of another, different electronic device. In some cases, the electronic device is a computing device, and the at least one processor is part of the computing device.

Numerous benefits are achieved by way of the present invention over conventional techniques. For example, embodiments of the present invention may provide efficient cooling mechanism for optimizing device performance through intelligent algorithms using sensory devices. Embodiments of the present invention may also provide seamless user experience due to efficient cooling by minimizing the throttling down the operating frequencies.

These and other embodiments of the invention along with many of its advantages and features are described in more detail in conjunction with the text below and attached figures.

BRIEF DESCRIPTION OF THE DRAWINGS

FIG. 12 illustrates yet another exemplary use case of a method for improving efficiency of a thermal cooling system for a computing device according to some embodiments.

DETAILED DESCRIPTION OF SPECIFIC EMBODIMENTS

To prevent overheating, devices may include thermal cooling measures. Cool air may flow towards the heat generating components and the hot air may be steered away from the heat generating components and vented off the device. To keep a thermal cooling system working efficiently, it may be desirable to keep the devices well ventilated and ensure that the thermal vents (i.e., the inlets and outlets) are not blocked. This disclosure generally refers to technologies to provide thermal cooling measures to such devices and their attendant components, and more specifically for optimizing one or more inlets and outlets for flow of cool and hot air respectively. Though described for computing devices, particularly for portable devices, one of skill in the art will readily appreciate other applicable systems, devices, and settings suitable for the teachings of this disclosure.

In addition, the efficiency of a thermal cooling system may depend on the orientation of a particular device. If a thermal vent is facing downward, convection from hot air may compromise a cooling system, as hot air tends to rise up by nature. For example, outward flow of hot air through thermal vents and hot air flowing upwards due to natural convection may oppose each other and reduce the efficiency of thermal cooling systems and measures. Therefore, it may be desirable to keep devices employing thermal management systems in orientations such that the air flow is not impeded.

Figure 1:
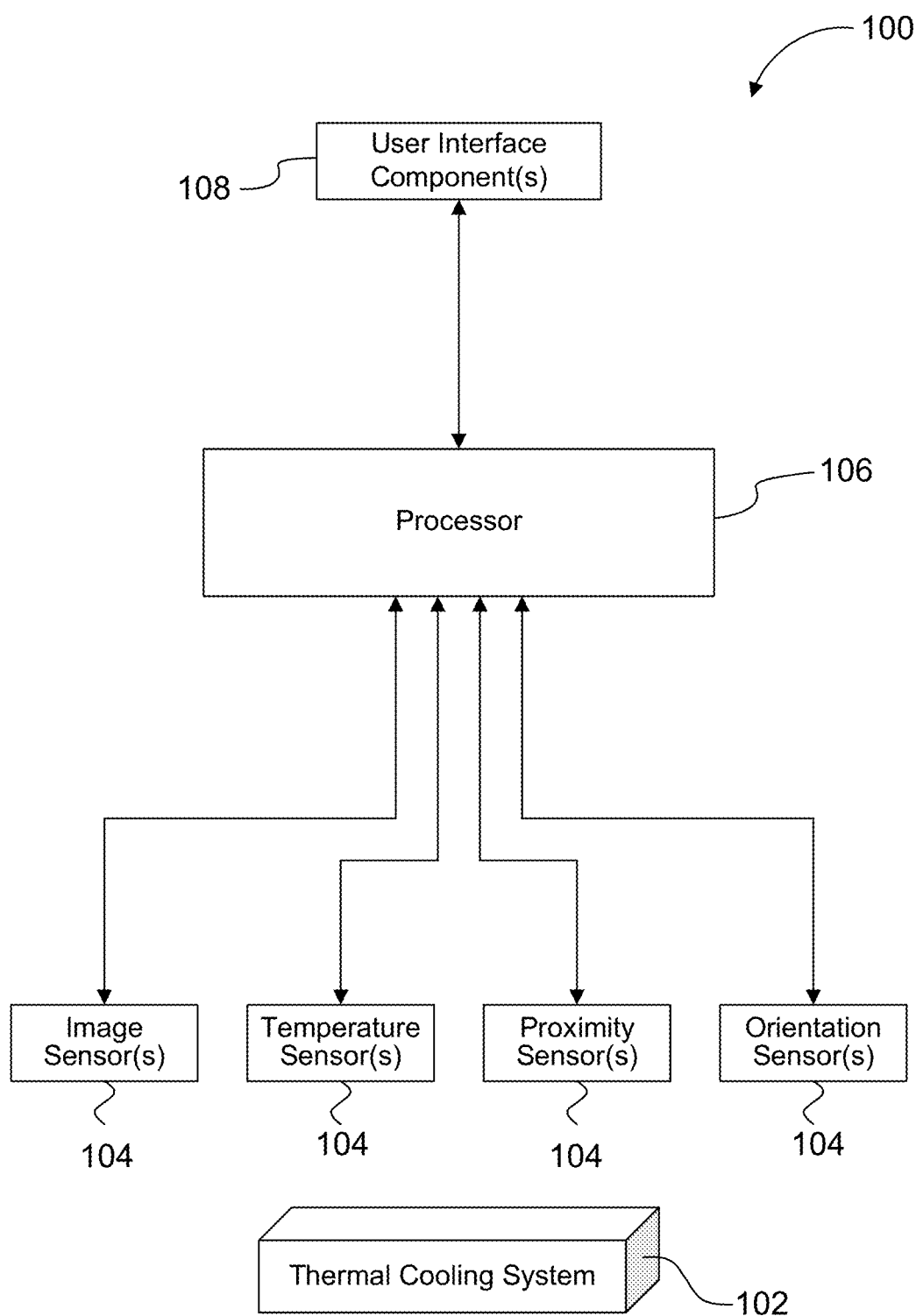
FIG. 1 is a simplified block diagram of a computing system according to some embodiments of the present invention.

FIG. 1 is a simplified block diagram of a computing system 100 according to some embodiments of the present invention. The computing system 100 may include a thermal cooling system 102, one or more sensors 104, and multiple electronic hardware components including at least one processor 106 and one or more user interface components 108. The thermal cooling system 102 may, for instance, be part of or associated with an electronic device and configured to dissipate heat generated by or otherwise physically present in the electronic device. The one or more sensors 104 may be configured to monitor one or more operating conditions of the thermal cooling system 102 and may be communicatively and/or operatively coupled to the at least one processor 106, which in turn may be communicatively and/or operatively coupled to the one or more user interface components 108. Briefly, and as described in further detail below, the at least one processor 106 may be configured to continuously or periodically monitor data output from the one or more sensors 104 for the presence of one or more operating conditions in which operation of the thermal cooling system 104 is impeded, and provide one or more alerts through the one or more user interface components 108 upon detecting the presence of one or more such operating conditions.

More specifically, the thermal cooling system 102 may include at least one thermal vent for dissipating heat away from the physical housing structure of such an electronic device. The electronic device that the thermal cooling system 102 is configured to cool may, for example, be a smartphone, tablet, laptop, desktop computer, smartwatch, gaming or other entertainment console, dongle, set-top box, power supply, or smart household appliance. Although not explicitly depicted in FIG. 1, such an electronic device may be included as part of the computing system 100. In some examples, at least a portion of the multiple electronic hardware components of the computing system 100 may be those which are part of the electronic device. That is, at least one of the multiple electronic hardware components of the computing system 100 may be either contained within or attached to the electronic device's casing or other physical housing structure. In this way, the thermal cooling system 102 may be configured to dissipate heat that is generated by one or more electronic hardware components of the computing system 100 that belong to the electronic device of the computing system 100. For instance, the thermal cooling system 102 may be configured to dissipate heat away from an electronic device to which the at least one processor 106, one or more user interface components 108, and/or one or more other electronic hardware components of the computing system 100 belong.

In some embodiments, the computing system 100 may include one or more electronic devices in addition to the abovementioned electronic device with which the thermal cooling system 102 is associated. In such embodiments, some electronic hardware components of the computing system 100 may be part of one electronic device, while other electronic hardware components of the computing system 100 may be part of another electronic device. For instance, the at least one processor 106 of the computing system 100 may be part of an electronic device with which the thermal cooling system 102 is associated, such as a computing device, while the one or more user interface components 108 may be part of a user device, such as a display device or other electronic device that is a peripheral to the computing device.

The one or more sensors 104 configured to monitor one or more operating conditions of the thermal cooling system 102 may, for example, include image sensors, temperature sensors, proximity sensors, orientation sensors, and the like.

Such image sensors may be leveraged for capturing images of the electronic device and/or the environment within which the electronic device is located from internal and/or external perspectives, which the at least one processor 106 may analyze for the purposes of identifying images or regions thereof that show the at least one vent of the thermal cooling system 102 in an obstructed or otherwise thermally-disadvantageous state. Temperature sensors may be configured to measure temperature at one or more locations within, on, or around the electronic device, and thus provide output data that may enable the at least one processor 106 to determine whether the electronic device is hot or is becoming hot. Proximity sensors may be configured to monitor the at least one thermal vent's proximity to external objects, and thus provide output data that may enable the at least one processor 106 to determine whether any external objects are in close enough proximity so as to block or otherwise impede airflow through the at least one thermal vent of the thermal cooling system 102. Orientation sensors may be configured to monitor the relative orientation of the thermal cooling system 102 and/or electronic device, and thus provide output data that may enable the at least one processor 106 to determine whether the at least one thermal vent is facing downward.

For examples in which an electronic device, such as a computing device, has relatively powerful processing capabilities and comes in a relatively small, portable form factor, the need to provide an efficient cooling system becomes even more critical. Having an efficient cooling system may be even more important for examples in which such a computing device runs one or more applications that are processing intensive (e.g., gaming, watching high-definition videos, augmented/mixed reality applications, and the like), as reduced processing power can mean degraded user experience in these cases.

Figure 2A:
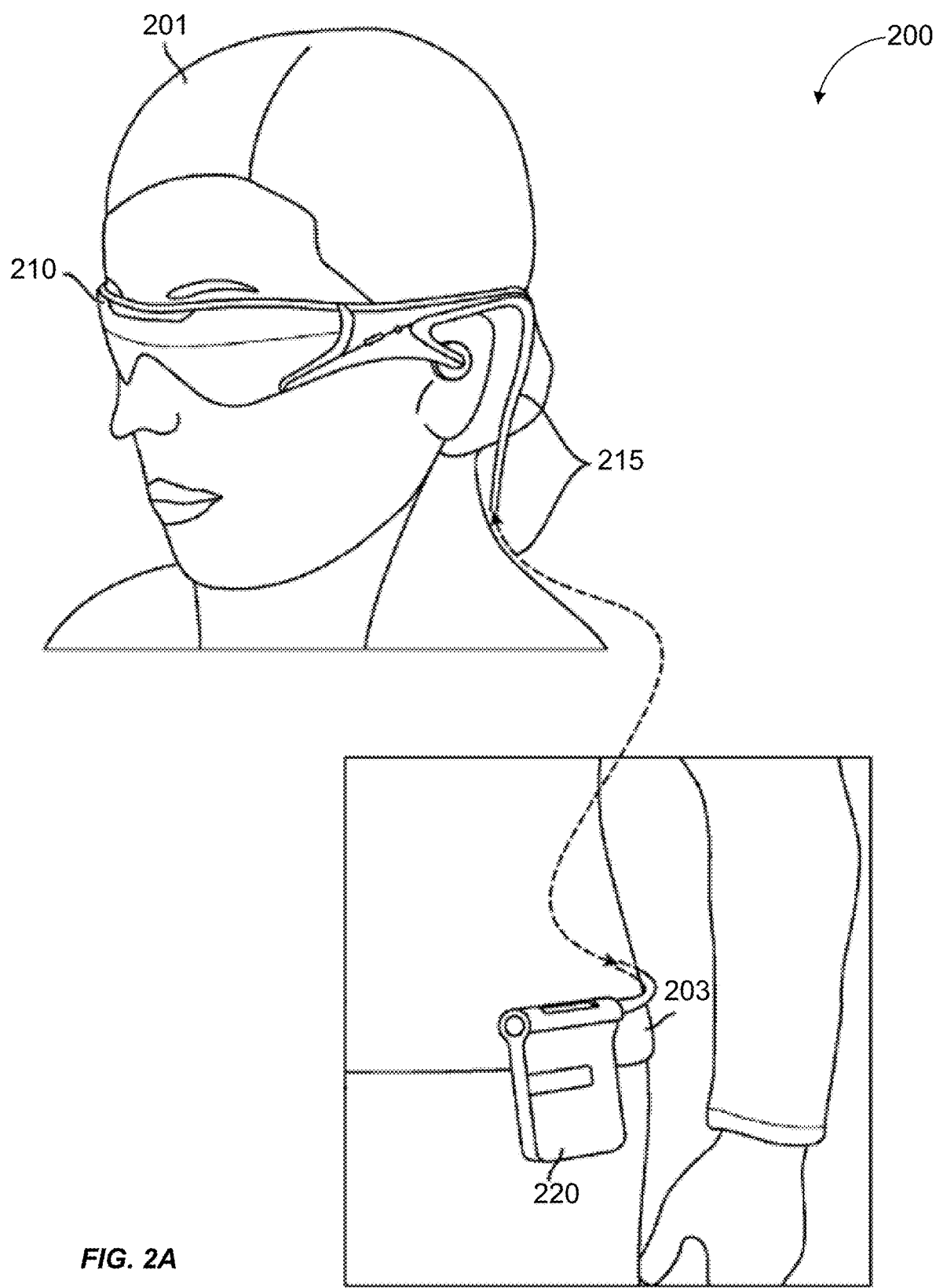
FIGS. 2A-2D illustrates exemplary situations where a computing device for an augmented reality system may be placed.

In some embodiments, the computing device may function as at least part of an augmented reality system. FIG. 2A shows an augmented reality system 200 that is operable to render virtual content (e.g., virtual objects, virtual tools, and other virtual constructs, for instance applications, features, characters, text, digits, and other symbols) in a field of view of a user 201, and comprises both a user device 210 and a computing device 220. More specifically, the user device 210 of the augmented reality system 200 may include optical components (e.g., a frame structure coupled to display system positioned in front of the eyes of the user 201) that deliver virtual content to the eyes of user 201, and the computing device 220 of the augmented reality system 200 may include other essential components (e.g., processing components, power components, memory, etc.) that perform a multitude of processing tasks to present the relevant virtual content to the user 201.

The computing device 220 may be operatively and/or communicatively coupled to the user device 210 by way of connection 215 (e.g., wired lead connection, wireless connection, etc.). Beyond being operatively and/or communicatively coupled in this manner, the user device 210 and the computing device 220 can be seen as being physically separate and/or displaced components of the augmented reality system 200. As such, the user device 210 and the computing device 220 may be positioned in different locations. For example, as illustrated in FIG. 2A, the user device 210 may be worn on the head of user 201, while the computing device 220 may be removably attached to the hip 203 of the user 201 in a belt-coupling style configuration. In other examples, the computing device 220 may be removably attached to another portion of the body of the user 201, attached to or located within a garment or other accessory (e.g., frame, hat or helmet, etc.) worn by the user 201, or positioned in another location within the environment of the user 201.

Figure 2D:
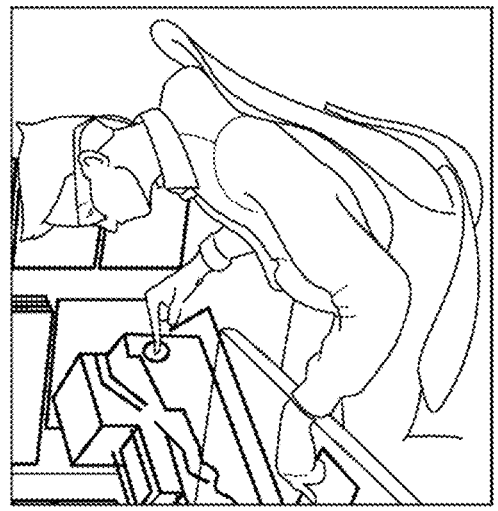
Figure 2C:
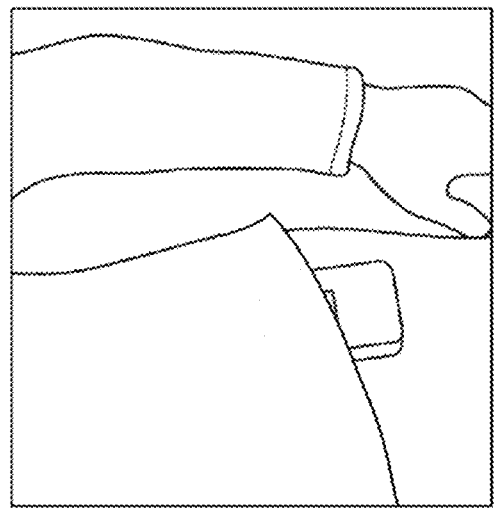
Figure 2B:
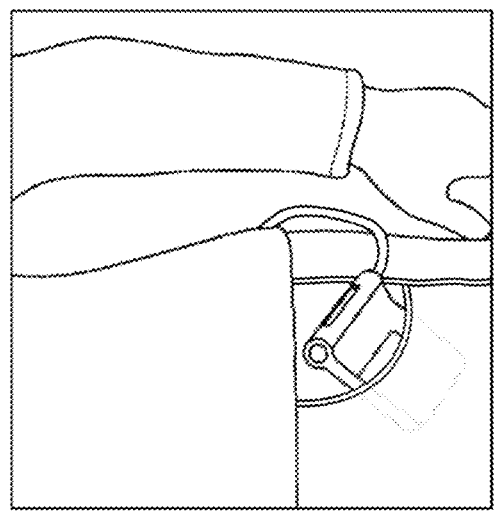

Although the relatively high level of independence the user device 210 and the computing device 220 may provide for highly flexible user experience, it may also present additional thermal cooling challenges in the augmented reality system 200. Compared to other types of computing devices, it may be more likely for a user of an augmented reality system, such as the augmented reality system 200 of FIG. 2A, to position the computing device of the augmented reality system in a thermally-disadvantageous location while in use. For example, a user of an augmented reality system, such as the augmented reality system 200, may also put the computing device of the augmented reality system in his or her pocket (as illustrated in FIG. 2B), or in a purse or a backpack, which may unintentionally block the thermal vents of a thermal cooling system for the computing device. A piece of garment, such as a longer shirt or jacket, as worn by a user of an augmented reality system, such as the augmented reality system 200, may also block the thermal vents of the computing device of the augmented reality system (as illustrated in FIG. 2C). When a user of an augmented reality system, such as the augmented reality system 200, sits in a chair, the computing device of the augmented reality system may be wedged between his or her body and the chair (as illustrated in FIG. 2D). The user may also place the computing device under a blanket or a pillow while lying on a couch or in a bed, or place the computing device on a table underneath a pile of papers, books, or other items. Unintentional blocking of thermal vents may occur in these situations as well.

Such unintentional blocking of the thermal vents of a thermal cooling system may occur more often in an augmented reality system, such as the augmented reality system 200, than in other portable computing devices, such as smartphones, tablets, laptops, smartwatches, and the like, as the user interfaces of such other computing devices are typically disposed in the same housing as the processing components. Also, those computing devices often perform their most computationally-intensive processes while the user is viewing a screen or interacting with a user interface. Thus, users of those computing devices are more likely to place them in relatively well-ventilated locations (e.g., on the surface of a desk, in the palm of a user's hand, in or attached to a cradle or docking station, on a stand, etc.) while in use.

Moreover, the augmented reality system 200, as well as other augmented reality systems described herein, may regularly operate at a higher power than other mobile devices, as such augmented reality systems may each include multiple displays and multiple cameras. For example, the power density of an augmented reality system can be on the upwards of twice as much as that of a laptop or tablet. For this reason, in some embodiments, an augmented reality system may include an active thermal cooling system, such as a blower-based thermal cooling system that includes a fan and has an inlet and an outlet. As such, peak performance may be achieved in the augmented reality system at least in part through efficient operation of such an active thermal cooling system.

The techniques described herein may be leveraged to manage the thermal conditions that may arise in computing devices in a variety of other scenarios. For example, a computing device may be tightly held or gripped in a user's hand for an extended period of time, or it may be placed on or adjacent to a relatively hot surface or object, such as another computing device, an area of a tabletop that is under direct sunlight, an oven and/or stovetop, an HVAC unit or heating vent, a fireplace, and the like. In such situations, the computing device may also reach temperatures that may affect its performance or even cause it to become unsafe.

Embodiments of the present invention provide methods for improving efficiency of a thermal cooling system of a computing device by employing one or more electronic sensors, such as proximity sensors (e.g., capacitance touch sensors), orientation sensors (e.g., accelerometers and gyroscopes), temperature sensors (e.g., thermistors, thermocouples, thermometers, resistance temperature detectors ("RTD"), semiconductor sensors, infrared sensors, etc.), and image sensors. The system may provide a user with an indication on the user interface (UI) alerting the user to adjust the position and/or orientation of the computing device, when the system detects that: (i) the thermal vents are blocked; and/or (ii) the thermal vents are facing downward. The methods may be applied to augmented reality (AR) systems and virtual reality (VR) systems, as well as other types of computing devices that may require thermal cooling.

Figure 3A:
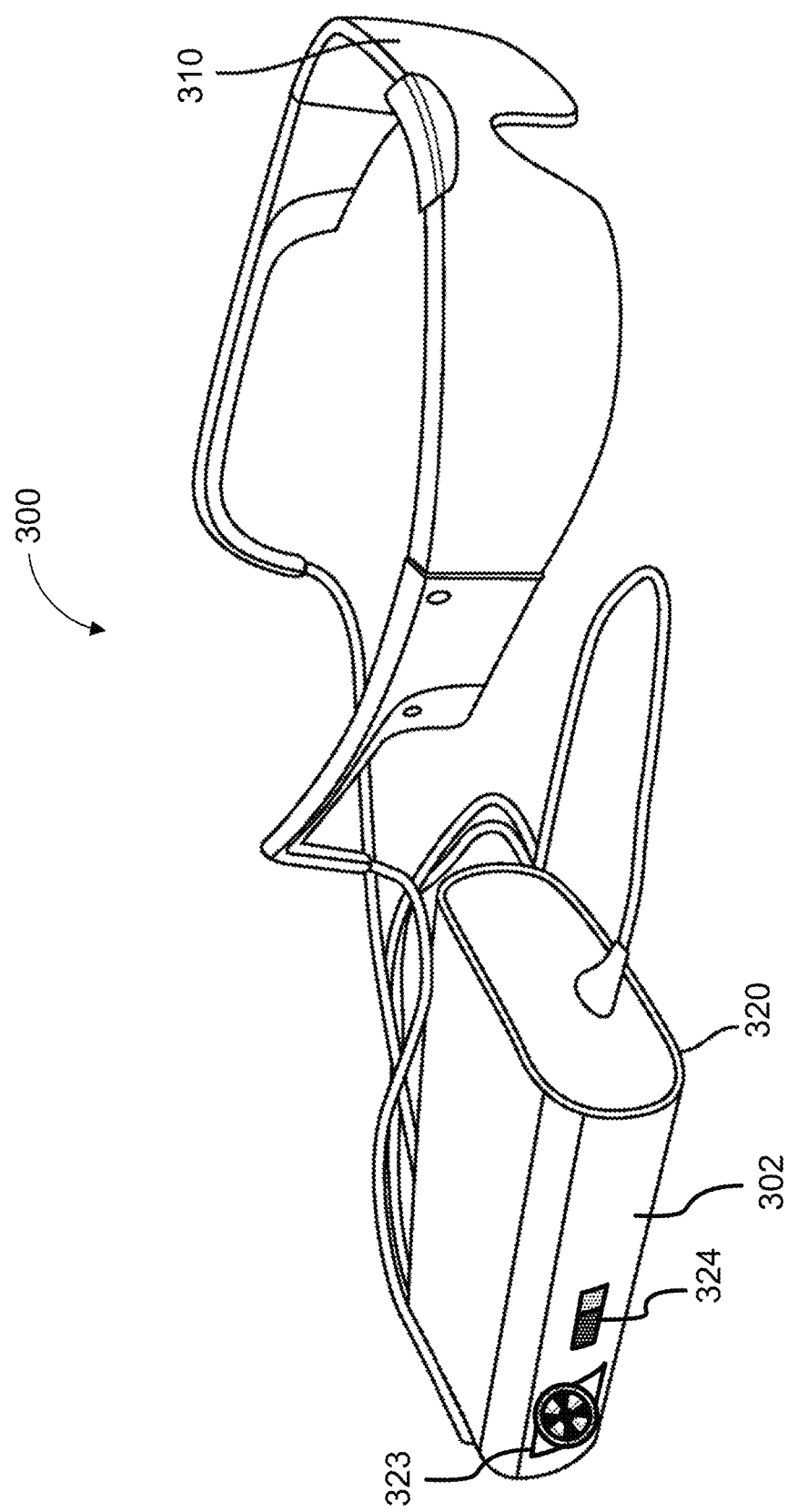
FIGS. 3A-3B illustrate schematic and block diagrams of an exemplary computing system according to some embodiments of the present invention.
Figure 3B:
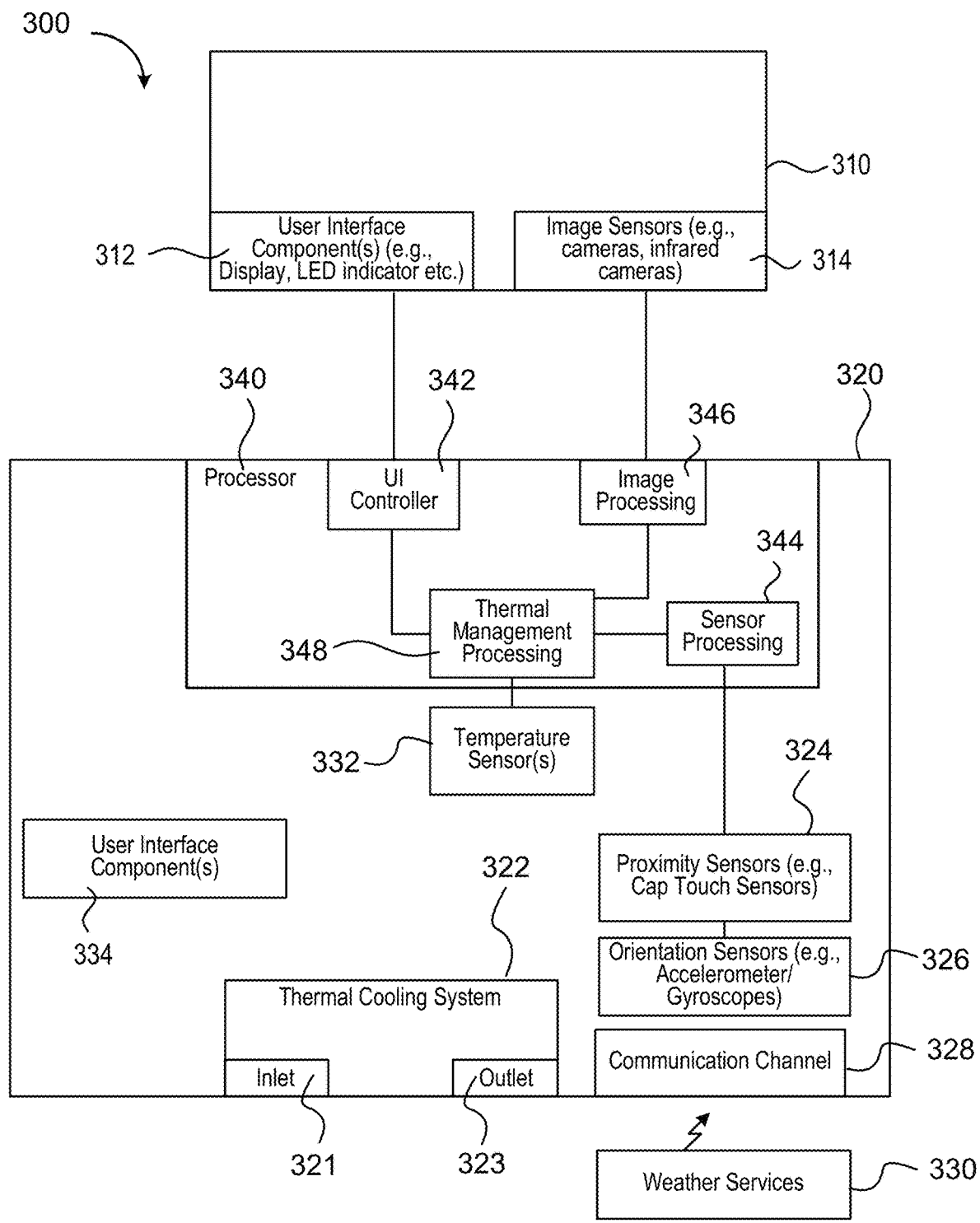

FIG. 3A illustrates schematically a computing system 300 having two or more electronic devices including a first electronic device 310 and a second electronic device 320, which may represent a user device and a computing device, respectively. FIG. 3B is a simplified block diagram of the computing system 300 according to some embodiments of the present invention. The computing system 300 may represent an augmented reality (AR) or virtual reality (VR) system that is similar in architecture and functionality to the computing system 100 as described in further detail above with reference to FIG. 1. As such, the first electronic device 310 and the second electronic device 320 may be similar or at least analogous to the user device 210 (e.g., headset) and the computing device 220 as described in further detail above with reference to FIG. 2A. Briefly, and as described in further detail below, the computing system 300, much like the computing system 100 of FIG. 1, may include a thermal cooling system 322, one or more sensors 314, 324, 326, and 332, at least one processor 340, and one or more user interface components 312.

More specifically, the computing system 300 may include a thermal cooling system 322 having at least one thermal vent 323 for dissipating heat out of and away from the second electronic device 320. In this example, a portion of the thermal cooling system 322 is contained within the physical housing structure 302 of the second electronic device 320, with the at least one thermal vent 323 serving as an interface between internal and external regions of the second electronic device 320. As depicted in FIG. 3A, a proximity sensor 324 is positioned at a surface of the physical housing structure 302 adjacent to the at least one thermal vent 323 of the thermal cooling system 322. In some embodiments, the proximity sensor 324 may also be configured to determine an approximate distance from the proximity sensor 324 to external objects. The second electronic device 320 may also include orientation sensors 326, such as accelerometers and gyroscopes, for sensing the orientation of the second electronic device 320.

The first electronic device 310 may include user interface components 312, such as displays for displaying virtual reality content to a user. The user interface components 312 may also include LED indicators, audios, haptic feedback devices such as vibration devices, and the like. The first electronic device 310 may also include one or more image sensors 314. The image sensors 314 can include regular cameras, as well as infrared cameras such as forward looking infrared (FLIR) cameras. In some embodiments, the first electronic device 310 may further include one or more microphones, inertial measurement units, accelerometers, compasses, GPS units, radio devices, and/or gyros.

The second electronic device 320 of the computing system 300 may be operatively coupled to the first electronic device 310 in much the same way that the computing device 220 as described above may be coupled to the user device 210 of FIG. 2A. It follows that, beyond being coupled in this manner, the second electronic device 320 and the first electronic device 310 can be seen as being physically separate and/or displaced components of the computing system 300. For example, the second electronic device 320 may be operably or at least communicatively tethered to the first electronic device 310 via one or more wires or optical fibers via a cable with appropriate connectors, and may communicate according to any of a variety of tethered protocols, such as UBS®, USB2®, USB3®, Ethernet®, Thunderbolt®, and Lightning® protocols. Alternatively or additionally, the second electronic device 320 may be wirelessly communicatively coupled to the first electronic device 310. For example, the second electronic device 320 and the first electronic device 310 may each include a transmitter, receiver or transceiver (collectively radio) and associated antenna to establish wireless communication there between according to any of a variety of wireless communications protocols, such as BLUETOOTH®, WI-FI® or some IEEE 802.11 compliant protocol (e.g., IEEE 802.11n, IEEE 802.11a/c, WiGig IEEE 802.11ad, High-Efficiency Wireless (HEW) 802.11ax, etc.), Long Term Evolution (LTE) or LTE Advanced, and the like.

The second electronic device 320 may include one or more processors or controllers 340, as well as digital memory, such as flash memory, both of which may be utilized to assist in the processing, caching, and storage of data that is captured, generated, or received by at least some components and subcomponents of the computing system 300, such as those depicted in FIG. 3B as being housed within the first electronic device 310 or the second electronic device 320. For example, the one or more processors 340 of the second electronic device 320 may include a user interface (UI) controller 342 for controlling one or more user interface components 334 of the second electronic device 320 and/or one or more of the user interface components 312 of the first electronic device 310. In some embodiments, the first electronic device 310 may or may not include user interface components 312, and the UI controller 342 may control the one or more user interface components 334 of the second electronic device 320 in addition to or in place of the user interface components 312 of the first electronic device 310, respectively.

The one or more processors 340 of the second electronic device 320 may, for example, take the form of one or more central processing units (CPUs), graphics processing units (GPUs), micro-controllers, microprocessors, digital signal processors, application specific integrated circuits (ASICs), programmable gate arrays, programmable logic circuits, or other circuits either embodying logic or capable of executing logic embodied in instructions encoded in software or firmware. The second electronic device 320 may include one or more nontransitory computer- or processor-readable media, for example volatile and/or nonvolatile memory, for instance read only memory (ROM), random access memory (RAM), static RAM, dynamic RAM, Flash memory, EEPROM, etc. In some embodiments, the above mentioned processing and memory components may be further utilized to assist in the processing, caching, and storage of data acquired and/or processed using a remote processing module and/or remote data repository, possibly for passage to the display of the first electronic device 310 after such processing or retrieval.

As most of the computer processing may be performed by the processor 340 in the second electronic device 320, the second electronic device 320 may get hot, which may affect the device performance as well as user comfort and safety. In addition, because the second electronic device 320 and the first electronic device 310 may be physically displaced from one another and handled independently, much like the computing device 220 as described above with reference to FIG. 2A, the second electronic device 320 may end up in thermally-disadvantageous positions while the computing system 300 is in use. Therefore, the thermal cooling system 322 may be an active or passive thermal cooling system that uses thermal vents (i.e., inlets and outlets 321 and 323) for transferring cool air in and hot air out of the second electronic device 320. In the following, the second electronic device 320 may also be referred to as the "computing device 320."

As mentioned above, the computing system 300 may also include one or more proximity sensors 324 positioned adjacent the thermal vents 323 of the second electronic device 320 for detecting the presence of nearby objects. Proximity sensors 324 may include capacitive touch sensors, photoelectric sensors, inductive sensors, infrared sensors, ultrasonic sensors, radar sensors and the like.

The processor of the computing system 300 may include a sensor processing unit 344 coupled to the proximity sensors 324 and the orientation sensors 326. The sensor processing unit 344 may monitor the readings of the proximity sensors 324 to determine whether an object has been detected near a proximity sensor 324, and generate an interrupt when it has determined that an object has been detected. Similarly, the sensor processing unit 344 may monitor the readings of the orientation sensors 326 to determine whether the computing device 320 is oriented such that the thermal vents 323 are facing downward, and generate an interrupt in such an event.

The processor 340 may also include an image processing unit 346 (e.g., CPUs and GPUs) for real-time processing of the images acquired by the image sensors 314. Image processing may include image detection, pattern recognition, and the like. For example, when the computing device 320 is in the field of view of an image sensor 314, the image sensor 314 may capture one or more images of the computing device 320. The image processing unit 346 may analyze the one or more captured images to determine whether a thermal vent 323 of the thermal cooling system 322 is blocked by an object or is facing downward. In embodiments where the computing system 300 includes proximity sensors 324 and orientation sensors 326 in addition to image sensors 314, image sensing and image processing may serve to confirm a condition that a thermal vent 323 is blocked or facing downward as determined by the readings of the proximity sensors 324 and the orientation sensors 326. According to some other embodiments, image sensing and image processing may serve as an alternative to proximity sensors 324 or orientation sensors 326.

According to some embodiments, one or more machine learning techniques may be leveraged so as to enable the image processing unit 346 to recognize image patterns that correlate with thermal management issues with enhanced accuracy. In some examples, the image processing unit 346 may perform such operations in real-time. For example, the image processing unit 346 may maintain or otherwise have access to one or more probabilistic statistical models (e.g., logistic regression models, Hidden Markov models, decision trees, artificial neural networks, Bayesian networks, combinations thereof, etc.) having been pre-trained using some prior images that show the computing device 320 being placed in a pocket, covered by some clothing, furniture, or the like. Once pre-trained, the one or more probabilistic statistical models may be further updated based on data obtained at runtime, so as to enable the image processing unit 346 to "tweak" or otherwise fine-tune its image recognition capabilities as applied to a particular user based on the user's habit. In some implementations, the image processing unit 346 may analyze one or more images captured by the one or more image sensors 314 to recognize or otherwise identify one or more objects in the one or more images positioned less than a threshold distance away from the second electronic device 320. In some of these implementations, the image processing unit 346 may utilize image recognition software that is programmed and/or trained to recognize or otherwise identify objects resembling a physical housing structure of the second electronic device 320 or a portion thereof, one or more components of the second electronic device 320 (e.g., thermal cooling system 322, thermal vent 323, etc.), and the like. For embodiments in which one or more infrared cameras (e.g., forward looking infrared (FLIR) cameras) or other thermographic imaging sensors are employed, the image processing unit 346 may leverage one or more image processing techniques for recognizing heat signatures of one or more portions of the leverage one or more image processing techniques for recognizing heat signatures of the physical housing structure of the second electronic device 320 (while in operation), one or more components of the second electronic device 320 (e.g., thermal cooling system 322, thermal vent 323, etc.), or combinations thereof. By locating the second electronic device 320 in the one or more images, the image processing unit 346 can analyze other portions of the one or more images for one or more objects abutting and/or positioned within the immediate vicinity of the proximity sensor 324. In some embodiments, the image processing unit 346 may leverage one or more of the image processing techniques described above for recognizing such one or more nearby objects. As such, in one or more of these embodiments, the image processing unit 346 may utilize image recognition software programmed and/or trained to recognize or otherwise identify a variety of everyday objects (e.g., architectural features of properties, household items, furniture, electronic devices, plants, creatures, vehicles, landmarks, etc.), as well as objects resembling the human body or an anatomical portion thereof. Similarly, for embodiments in which one or more infrared cameras are employed, the image processing unit 346 may leverage one or more image processing techniques for recognizing heat signatures of the human body, as well as the heat signatures of creatures and inanimate objects. In some implementations, the image processing unit 346 and/or the thermal management processing unit 348 may leverage both thermal image processing techniques and non-thermal image processing techniques in tandem so as to develop, store, and maintain one or more meshed maps of a surrounding area enriched with thermal data.

The computing system 300 may also include one or more temperature sensors 332 (e.g., thermistors, thermocouples, thermometers, resistance temperature detectors ("RTD"), semiconductor sensors, infrared sensors, etc.). For example, one or more temperature sensors 332 may include a thermistor positioned adjacent the processor 340 (e.g., CPUs and GPUs) to sense the temperature of the processor 340 (referred herein as internal temperature of the computing device 320). If the internal temperature exceeds a predetermined threshold temperature, the computing device 320 may scale down its operating frequency (i.e., throttling its computing power). In some examples, as described in further detail below, the computing system 300 may provide one or more alerts or other feedback signals to a user through one or more of a variety of different user interface components and electronic devices in response to determining that the internal temperature exceeds a predetermined threshold temperature. Temperature sensors 332 may also be positioned adjacent one or more surfaces of the computing device 320 to sense the surface temperature of the computing device 320. It may be important to ensure that the surface temperature of the computing device 320 is below a comfort threshold temperature or safety threshold temperature for portable computing devices that may come in contact with human bodies. Usually the throttle threshold temperature is lower than the comfort threshold temperature, and the comfort threshold temperature is lower than the safety threshold temperature. However, in other embodiments, the threshold temperatures can relate to each other in different manner. For example, the throttling threshold temperature may range from about 50° C. to about 100° C. (e.g., 85° C.), the comfort threshold temperature may range from about 30° C. to about 50° C. (e.g., 43° C.), and the safety threshold temperature may range from about 45° C. to about 75° C. (e.g., 50° C.). In some implementations, one or more of such threshold temperatures may be set to temperature values in compliance with one or more thermal safety requirements, such as those specified in association with one or more thermal safety standards (e.g., UL/IEC/EN-60950, ANSI/UL-61010, ISO 13732-1, NASA 20100020960, NASA-STD-3001, IEC/EN 60335-1, UL 62368-1, etc.). In some embodiments, temperature sensing may serve as an additional check when a thermal management issue has been detected by proximity sensors 324, orientation sensors 326, and/or image processing 346. In some implementations, the comfort threshold temperature and/or safety threshold temperature may be selectively enforced based on whether or not the computing device 230 is determined to be in within relatively close proximity to a human body or anatomical portion thereof. For example, in such implementations, the computing system 300 may elect not to enforce the comfort threshold temperature and/or safety threshold temperature if it can be confirmed, based on sensor data (e.g., output from one or more sensors 314, 324, 326, and/or 332), that the computing device 320 is not within a threshold distance of a human body or anatomical portion thereof. Examples of systems and techniques that may be employed in such implementations for detecting, evaluating, and responding to a computing device's proximity to a human body are described in further detail in U.S. Patent Publication No. 2018/0175944, the entirety of which is incorporated herein by reference.

The processor 340 may further include a thermal management processing unit 348 coupled to the sensor processing unit 344, the image processing unit 346, the temperature sensors 332, and the UI controller 342. The thermal management processing unit 348 may be configured to analyze the information provided by the sensor processing unit 344, the image processing unit 346, and the temperature sensors 332, to determine and/or confirm a thermal management issue, and to take appropriate actions. For example, in response to determining that the thermal vents 321 or 323 are blocked or facing downward, the thermal management processing unit 348 may generate certain feedback signals (e.g., visual displays, audio signals, haptic signals, etc.) to be sent to a user through the user interface 312, so as to alert the user to re-position or re-orient the computing device 320 to correct the problem. In some embodiments, the thermal management processing unit 348 may provide input to the UI controller 342 indicating that the thermal vents 321 or 323 have been determined to be blocked or facing downward, and the UI controller 342 may operate in conjunction with one or more user interface components 312 to generate the appropriate feedback signals responsive to the input received from the thermal management processing unit 348. The thermal management processing unit 348 may also determine the priority, frequency, and/or type of messages to be sent to the user based on the temperature information (e.g., whether the throttling threshold temperature, the comfort threshold temperature, or the safety threshold temperature has been exceeded). The thermal management processing unit 348 may also cause CPUs and/or GPUs of the second electronic device 320 to scale down their operating frequencies when the throttling threshold temperature has been exceeded, or even to shut down such CPUs and/or GPUs when the safety threshold temperature has been exceeded.

The thermal management processing unit 348 may be configured to monitor thermal management issues while not adding excessive power consumption of the computing device 320. For example, in embodiments where the computing device 320 includes proximity sensors 324 and orientation sensors 326, those sensors 324 and 326 may serve as the "first line of defense," as those sensors 324 and 326 may consume relatively little computing power. Only when those sensors 324 and 326 have detected any potential issues, the thermal management processing unit 348 may initiate image processing, which may consume relatively more computing power. Thus, image processing may serve to confirm or verify that a thermal management issue indeed exists.

In embodiments where the computing device 320 does not include any proximity sensors 324 and orientation sensors 326, the thermal management processing unit 348 may monitor thermal management issues by periodically polling the image processing unit 346. In some embodiments, a polling frequency may depend on the processor temperature and/or the surface temperatures of the computing device 320 as measured by the temperature sensors 332. If the temperature is below any of the predetermined threshold temperatures (e.g., throttle threshold temperature, comfort threshold temperature, and safety threshold temperature), the thermal management processing unit 348 may not poll the image processing unit 346 at all. If the temperature is above any of the predetermined threshold temperatures, the thermal management processing unit 348 may start polling the image processing unit 346. In some embodiments, the polling frequency may depend on the severity of the problem. For example, it may poll less frequently when only the throttle threshold temperature has been exceeded, and more frequently when the comfort threshold temperature or the safety threshold temperature has been exceeded.

In some embodiments, one or more machine learning techniques may be leveraged so as to enable the thermal management processing unit 348 to recognize certain patterns exhibited by the readings of the sensors with enhanced accuracy. For example, the thermal management processing unit 348 may maintain or otherwise have access to one or more probabilistic statistical models having been trained to recognize a thermal management issue from a pattern of temperature rising or falling. Examples of probabilistic statistical models which may be leveraged include logistic regression models, Hidden Markov models, decision trees, artificial neural networks, Bayesian networks, or combinations thereof. As another example, when a user drops the computing device 320 into a pocket, a proximity sensor 324 (e.g., a capacitance touch sensor) may initially sense a low capacitance value as the user let go of the computing device 320, and then sense a higher capacitance value when the computing device 320 settles in the pocket. In addition, one or more probabilistic statistical models may be trained so as to enable the thermal management processing unit 348 to recognize such a temporal pattern of the sensor signals as an indication that the thermal vent 323 may be blocked. A potential thermal management issue may also be recognized from the signal pattern of an accelerometer 326. For example, if the readings of an accelerometer 326 indicates that the computing device 320 is swaying back and forth, it may indicate that the user is carrying the computing device 320 in a purse or a bag while walking. In the case of a photodiode sensor (e.g., a proximity sensor 324), it may be inferred that the computing device 320 is in a purse or bag when the photodiode sees low or no light. Thus, one or more probabilistic statistical models maintained by or at least accessible to the thermal management processing unit 348 may be trained so as to enable the thermal management processing unit 348 to detect a "possibility" of a thermal management issue using the signals from these sensors. In some examples, the thermal management processing unit 348 may leverage such models to determine the likelihood that a thermal management issue has occurred or will occur. In these examples, the thermal management processing unit 348 may generate or otherwise obtain, for each issue in a predetermined set of one or more thermal management issues, a likelihood value or confidence score indicating a level of confidence that the respective thermal management issue has occurred or will occur based on data produced by the one or more probabilistic statistical models. Further, the thermal management processing unit 348 may function so as to effectively evaluate such confidence scores against one or more threshold values. It follows that the thermal management processing unit 348 may determine whether or not one or more thermal management issues have occurred or will occur based on the evaluation results. In the event that the thermal management processing unit 348 determines that a given confidence score satisfies one or more thresholds, the thermal management processing unit 348 may then proceed to poll the image processing unit 346 to confirm or verify that the detected thermal management issue indeed exists.

The types of feedback signals that may be provided for output to a user to alert the user of a thermal management issue may include visual displays (e.g., images, colors, and text), audio signals, haptic signals such as vibrations, and the like. More specifically, the thermal management processing unit 348 may operate in conjunction with the UI controller 342 to provide feedback signals for output through one or more user interface components 334 of the second electronic device 320 and/or one or more of the user interface components 312 of the first electronic device 310. For example, the computing device 320 may display text or graphics images on the user interface 312 or 334 to indicate that the thermal vents of the computing device 320 may be blocked or facing downward.

In a mixed reality or augmented reality system, the text or graphic images may appear on top or adjacent to the computing device 320. For example, the display may show an arrow pointing to the user's pocket, indicating that the pocket is smothering the thermal vents 323 of the computing device 320. In some embodiments, a hot region of the computing device 320 may be overlaid with text or graphics representative of thermal imaging data obtained by an infrared sensor. In some embodiments, the computing device 320 itself may display or emit a notification, in addition to or as an alternative to a display on the augmented reality system.

Through similar means, the thermal management processing unit 348 may provide the user with suggestions of cooler locations within the user's environment to which the user may move the computing device 320 to resolve the thermal management issues. According to some embodiments, when it is detected that the temperature of the computing device 320 has exceeded a safety threshold temperature, the thermal management processing unit 348 may cause a display to turn red or some other color, to alert the user to take immediate actions. In these embodiments, such cooler locations may, for instance, be identified at least in part on the basis of thermal imaging data obtained using one or more thermographic imaging sensors 314, such as one or more FLIR cameras. Each of such one or more thermographic imaging sensors 314 may, for instance, be located within the first electronic device 310, located within the second electronic device 320, or located elsewhere within the environment of the computing system 300. In some examples, the thermal management processing unit 348 may develop and/or utilize one or more meshed maps of the user's environment enriched with thermal data so as to identify such cooler locations. As described above, the computing system 300 may generate one or more meshed maps of a surrounding area enriched with thermal data at least in part by obtaining and processing both thermographic and non-thermographic images.

In some other embodiments, the thermal management processing unit 348 may provide haptic and/or audio signals to the user through a peripheral device to alert the user of a thermal management issue. For example, the thermal management processing unit 348 may cause a headset to vibrate. The thermal management processing unit 348 may also turn on an LED indicator on the headset.

In some embodiments, the thermal cooling system 322 of the computing device 320 may be equipped with a re-directable blower. In such cases, the thermal management processing unit 348 may redirect the blower in response to determining that the thermal cooling system 322 is in a thermally-disadvantageous position. In some examples, the thermal cooling system 322 in these embodiments may be further equipped with one or more additional inlets 321, outlets 323, or both. In this way, the blower may be redirected to move air through a different ventilation channel. Additionally or alternatively, the thermal cooling system 322 of the computing device 320 may be configured to run its blower in reverse, and may do so in response to determining that improved air flow may be achieved in the opposite direction.

In some embodiments, the computing device 320 or computing system 300 otherwise may also include a communication channel 328 configured to receive information from other sources. For example, the computing device 320 may receive local weather information from weather services 330 through the Internet. In some examples, the computing device 320 may communicate over one or more networks with one or more servers or other cloud computing devices that are configured to crawl or scrape one or more resources, such as web sites and pages, with information pertaining to current and/or predicted weather conditions in various geographic regions. In response to obtaining data indicating a forecast of relatively hot local weather conditions, the computing device 320 may provide an alert to a user indicating of the hot weather forecast and reminding the user to keep the computing device 320 out of heat and in a position such that the thermal vents 321 and 323 of the thermal cooling system 322 are unobstructed. In some examples, the computing device 320 may receive information from one or more other sources that is representative crowd-sourced data or otherwise reflects inferences made based on data obtained or produced in other computing systems (e.g., sensor measurements, usage data, etc.).

Figure 4:
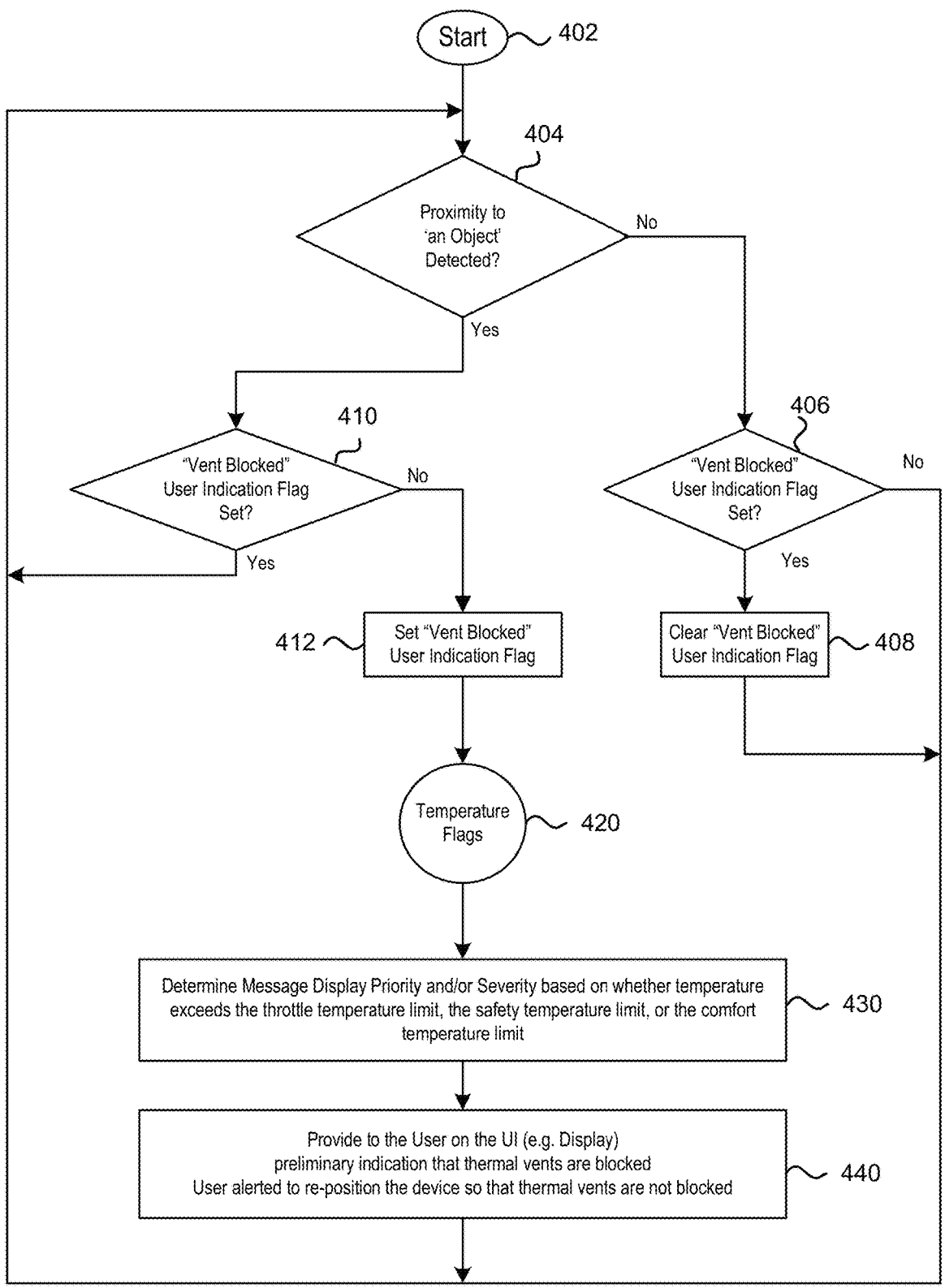
FIG. 4 is a simplified flowchart illustrating a method for improving efficiency of a thermal cooling system for a computing device using proximity sensing according to some embodiments of the present invention.

FIG. 4 is a simplified flowchart illustrating a method for improving efficiency of a thermal cooling system for a computing device using proximity sensing according to some embodiments of the present invention. The method starts at 402. The system may monitor the readings of one or more proximity sensors to determine whether there is any indication that there may be an object blocking the thermal vents of the thermal cooling system (404).

If it is determined at 404 that there is an indication that thermal vents may be blocked (e.g., as a result of the computing device being positioned inside a pocket or purse, against furniture or another surface, under textiles or other items, etc.), the system may proceed to check if the "vent blocked" user indication flag has been set (406). When the "vent blocked" user indication flag is set, it means that the computing device has sent feedback signals, such as visual displays, audio signals, or haptic signals, to a user of the computing device through a user interface to alert the user of the possibility that thermal vents are blocked, as described above, or that the computing device has otherwise already responded or initiated a response to the detected "vent blocked" thermal management issue.

If it is determined at 406 that the "vent blocked" user indication flag has not been set, the system may loop back to 404 to continue monitoring the readings of the proximity sensors for indications of thermal vents being blocked. If it is determined at 406 that the "vent blocked" user indication flag is set, the system may clear the "vent blocked" user indication flag (408), so as to stop sending the user feedback signals. A procession from 406 to 408 may, for instance, indicate that the detected thermal management issue has been resolved, which in this example may mean that the vent blockage has been removed. The system may then loop back to 404 to continue monitoring the readings of the proximity sensors.

If it is determined at 404 that there is an indication that the thermal vents are blocked, the system may proceed to determine whether the "vent blocked" user indication flag has been set (410). If it is determined that the "vent blocked" user indication flag has already been set, the system may loop back to 404 to continue monitoring the readings of the proximity sensors without setting the "vent blocked" user indication flag again, since repeatedly sending feedback signals to the user may annoy the user or otherwise affect user experience. If it is determined at 410 that the "vent blocked" user indication flag has not been set, the system may set the "vent blocked" user indication flag (412), so as to initiate sending feedback signals to the user to alert the user of the situation or take other appropriate action. The system may also proceed to set the temperature flags (420), as described in more detail below.

Figure 5:
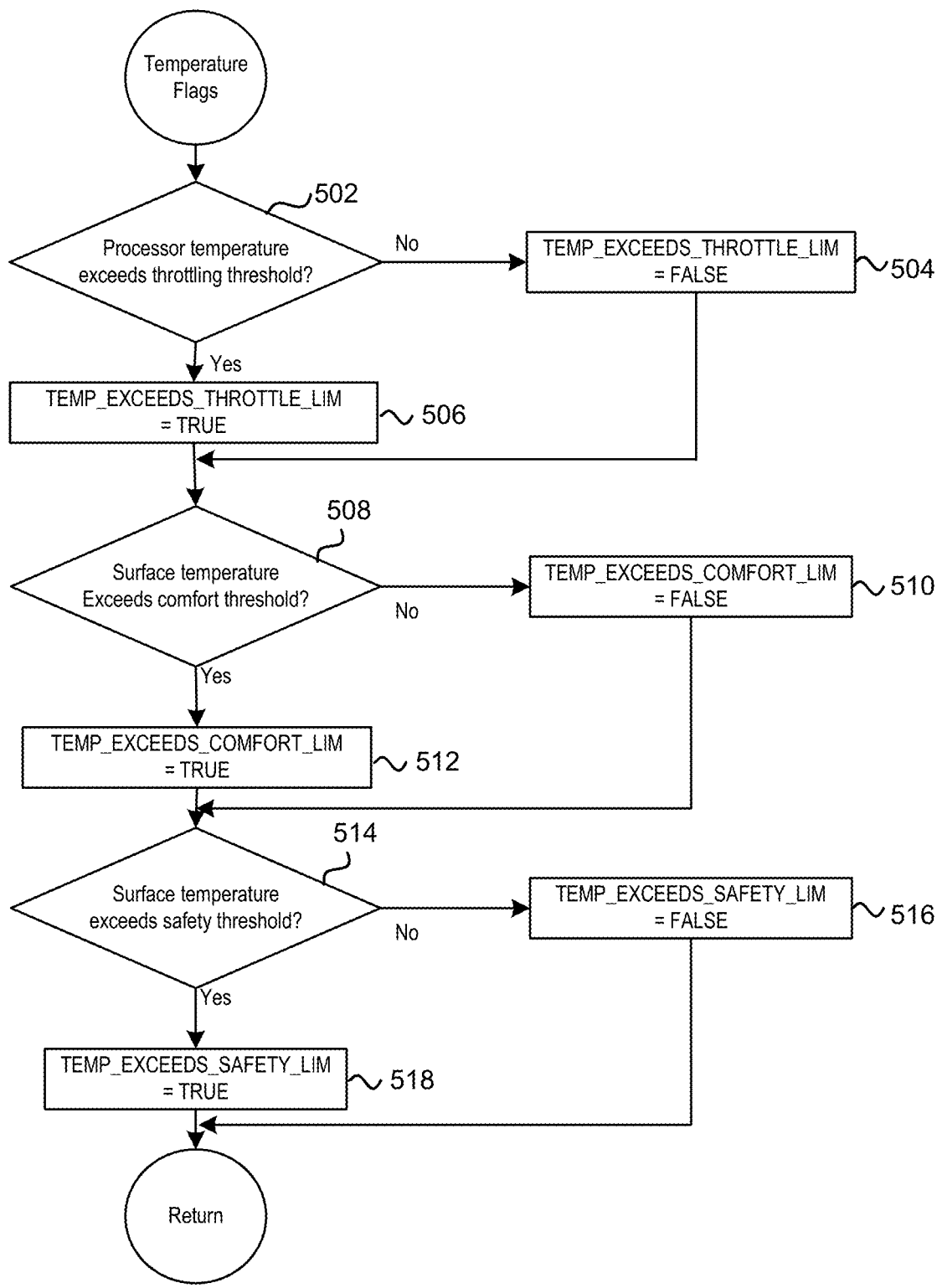
FIG. 5 is a simplified flowchart illustrating a method for improving efficiency of a thermal cooling system for a computing device using temperature sensing according to some embodiments of the present invention.

FIG. 5 is a simplified flowchart illustrating a method of temperature sensing and setting temperature flags according to some embodiments of the present invention. The method includes monitoring the readings of one or more temperature sensors to determine whether the internal temperature of the computing device exceeds a throttling threshold temperature (502). The throttling threshold temperature can be, for example, between about 50° C. and 100° C. (e.g., 85° C.). In some embodiments, the throttling threshold temperature can be between about 60° C. and 70° C., and below 60° C. in some of such embodiments. If it is determined at 502 that the internal temperature does not exceed the throttling threshold temperature, the system may proceed to set the "temperature exceeds throttle limit" flag to "false" (504), so as not to send any feedback signals to a user.

If it is determined at 502 that the internal temperature exceeds the throttling threshold value, the system may set the "temperature exceeds throttle limit" flag to "true" (506), so as to initiate sending feedback signals to a user to alert the user that the internal temperature has exceeded the throttling threshold. The system may also send control signals to the processor to cause the processor to scale down its operating frequency, so that the computing device may consume less power. As a result of scaling back the operating frequency, user experience may be degraded. According to some embodiments, throttling can be a linear process such that the operating frequency is scaled down gradually as the processor temperature increases. The user feedback signals may prompt the user to take appropriate actions to correct any thermal cooling issues, or at least be aware that the performance of the computing system may be degraded.

The system may then proceed to determine whether the surface temperature of the computing device has exceeded a comfort threshold temperature (508). In general, the comfort threshold temperature would be higher than the throttling threshold temperature. The comfort threshold temperature can be, for example, between 30° C. and 50° C. (e.g., 43° C.). In some examples, the comfort threshold temperature can be between about 40° C. and 50° C. When the comfort threshold temperature has been exceeded, it usually indicates a more severe thermal problem than when only the throttling threshold temperature has been exceeded, as not only user experience may be affected but user comfort may also be affected. If it is determined at 508 that the surface temperature does not exceed the comfort threshold temperature, the system may set the "temperature exceeds comfort limit" flag to "false" (510), so as not to send any feedback signals to the user with regard to exceeding the comfort temperature. The system may then proceed to determine whether the surface temperature has exceeded a safety threshold temperature (514).

If it is determined at 508 that the surface temperature has exceeded the comfort threshold temperature, the system may set the "temperature exceeds comfort limit" flag to "true" (512), so as to initiate sending feedback signals to the user to alert the user that the surface temperature has exceeded the comfort threshold temperature. Thus, the user may take appropriate actions to correct the thermal cooling issue.

The system may then proceed to determine whether the surface temperature has exceeded a safety threshold temperature (514). In general, the safety threshold temperature would be higher than the comfort threshold temperature. The safety threshold temperature can be, for example, between 45° C. and 75° C. (e.g., 50° C.). In some examples, the safety threshold temperature can be between about 55° C. and 75° C. When the safety threshold temperature has been exceeded, it may indicate a most severe thermal problem, as the problem may cause damage to the computing device and/or the safety of the user. Therefore, the system may even shut down the computing device when such a condition has been detected.

If it is determined at 514 that the surface temperature does not exceed the safety threshold temperature, the system may set the "temperature exceeds safety limit" flag to "false" (516), so as not to send any feedback signals to the user regarding exceeding the safety threshold temperature.

If it is determined at 514 that the surface temperature has exceeded the safety threshold temperature, the system may set the "temperature exceeds safety limit" flag to "true" (518), so as to initiate sending feedback signals to the user to alert the user that the surface temperature has exceeded the safety threshold temperature. The system may send an emergency alert to the user, for example by turning a display red. The system may also shut down the computing system to prevent any further damage to the computing device or any injury to the user.

In some embodiments, the system may perform temperature sensing and setting temperature flags independent of proximity sensing.

Referring again to FIG. 4, after the temperature flags have been set at 420, the system may determine the appropriate feedback signals (e.g., displaying text and/or images, audio and haptic signals, etc.) to be sent to the user (430), based on what threshold temperatures (e.g., the throttle threshold temperature, the comfort threshold temperature, the safety threshold temperature) have been exceeded, as described above. The system may then provide to the user through the user interface a preliminary indication that the thermal vents are blocked, and to alert the user to re-position the computing device so that the thermal vents are not blocked (440). For example, the system may display a text message or a graphics image indicating that the thermal vents may be blocked, and alert the user to re-position the computing device so that the thermal vents are not blocked. If the surface temperature has exceeded the safety threshold temperature, the system may display a severe warning, such as turning the entire display red. The system may then loop back to 404 to continue monitoring the readings of the proximity sensors for indications of the thermal vents being blocked. In some implementations, one or more of such feedback signals may be provided by way of another electronic device, such as a smartphone or handheld controller directly or indirectly communicatively coupled to the system.

As described above, the proximity sensors may serve as a "first line of defense" to check for indications of possible blocking of the thermal vents. The temperature sensors may serve as an additional check to determine whether the possible blocking of the thermal vents may have caused the temperatures of the computing device (processor temperature and surface temperature) to reach certain thresholds. If so, feedback signals may be sent to the user to alert the user to take appropriate actions to resolve the thermal issue.

It should be appreciated that the specific steps illustrated in FIG. 4 provide a particular method for improving efficiency of a thermal cooling system for a computing device using proximity sensing according to some embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
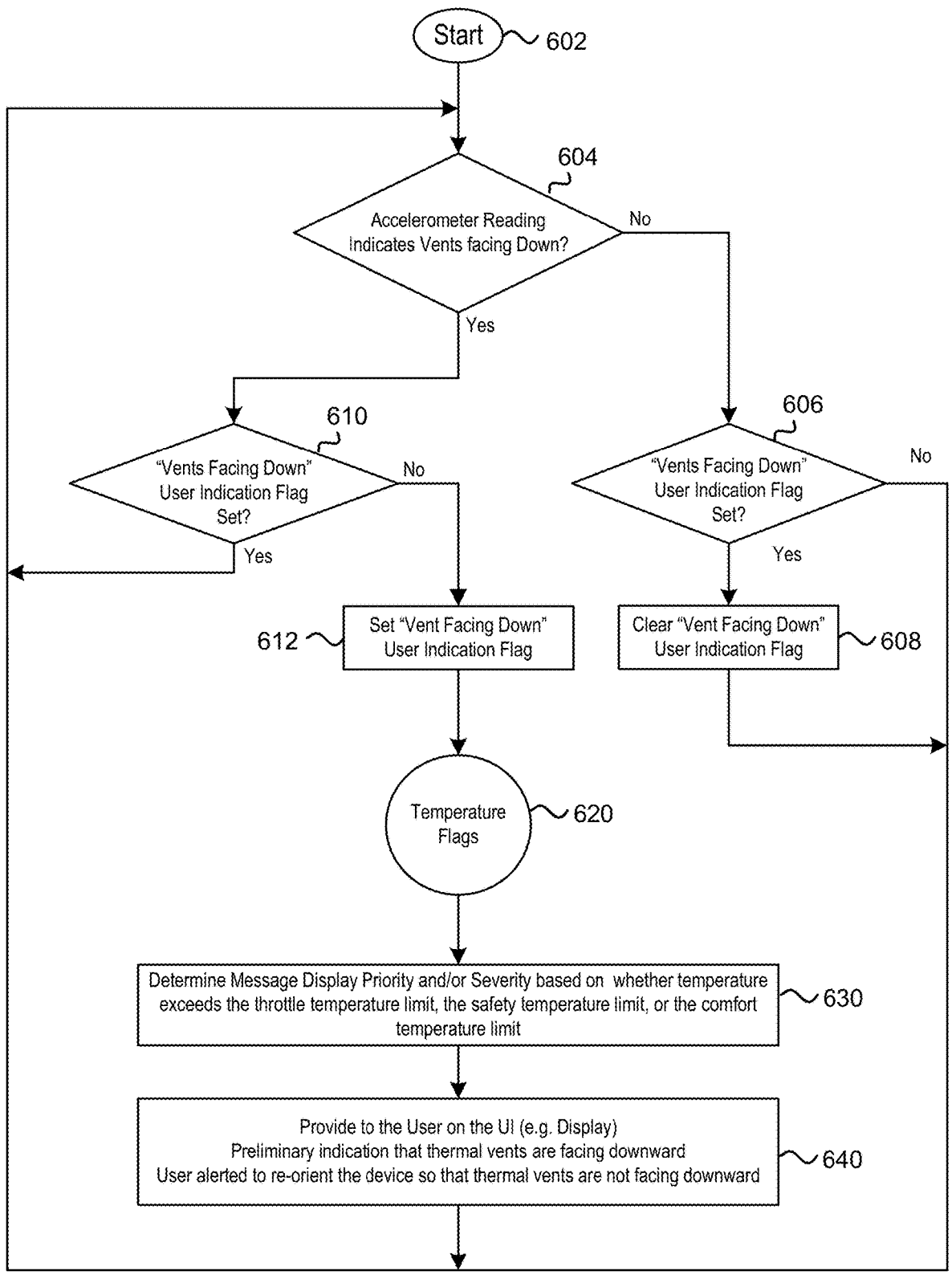
FIG. 6 is a simplified flowchart illustrating a method for improving efficiency of a thermal cooling system for a computing device using orientation sensing according some embodiments of the present invention.

FIG. 6 is a simplified flowchart illustrating a method for improving efficiency of a thermal cooling system for a computing device using orientation sensing according some embodiments of the present invention. The method starts at 602. The system may monitor the readings of one or more orientation sensors (e.g., accelerometers and gyroscopes) to determine whether there is any indication that the thermal vents may be facing downward (604) (e.g., as a result of the computing device being positioned upside down or on its side).

If it is determined at 604 that there is an indication that the thermal vents may be facing downward, the system may proceed to check if the "vents facing down" user indication flag is set (606). If it is determined that the "vents facing down" user indication flag is not set, the system may loop back to 604 to continue monitoring the readings of the orientation sensors. If it is determined that the "vents facing down" user indication flag is set, the system may clear the "vents facing down" user indication flag (608), so as to stop sending the user feedback signals. The system may then loop back to 604 to continue monitoring the readings of the orientation sensors.

If it is determined at 604 that there is an indication that the thermal vents may be facing downward, the system may check whether the "vents facing down" user indication flag is set (610). If it is determined that the "vents facing down" user indication flag has already been set, the system may loop back to 604 to continue monitoring the readings of the orientation sensors without setting the "vents facing down" user indication flag again, so as to avoid repeatedly sending feedback signals to the user. If it is determined at 610 that the "vents facing down" user indication flag has not been set, the system may set the "vents facing down" user indication flag (612), so as to initiate sending feedback signals to the user to alert the user of the situation. The system may also proceed to set the temperature flags (620), as described above in relation to FIG. 5.

After the temperature flags have been set at 620, the system may determine the appropriate feedback signals (e.g., displaying text and/or images, audio and haptic signals, etc.) to be sent to the user (630), based on what threshold temperatures (e.g., the throttle temperature threshold, the comfort temperature threshold, the safety temperature threshold) have been exceeded. The system may then provide to the user through the user interface preliminary indication that the thermal vents are facing downward, and to alert the user re-orient the computing device so that the thermal vents are not facing downward (640). For example, the system may display a text message or a graphics image indicating that the thermal vents may be facing downward, and alert the use to re-orient the device so that the thermal vents are not facing downward. The system may then loop back to 604 to continue monitoring the readings of the orientation sensors.

As described above, the orientation sensors may serve as a "first line of defense" to check for indications of the thermal vents facing downward. The temperature sensors may serve as an additional check to determine whether the possible thermal issue may have caused the temperatures of the computing device (processor temperature and surface temperature) to reach certain thresholds. If so, feedback signals may be sent to the user to alert the user to take appropriate actions to resolve the thermal issue.

It should be appreciated that the specific steps illustrated in FIG. 6 provide a particular method for improving efficiency of a thermal cooling system for a computing device using orientation sensing according to some embodiments of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
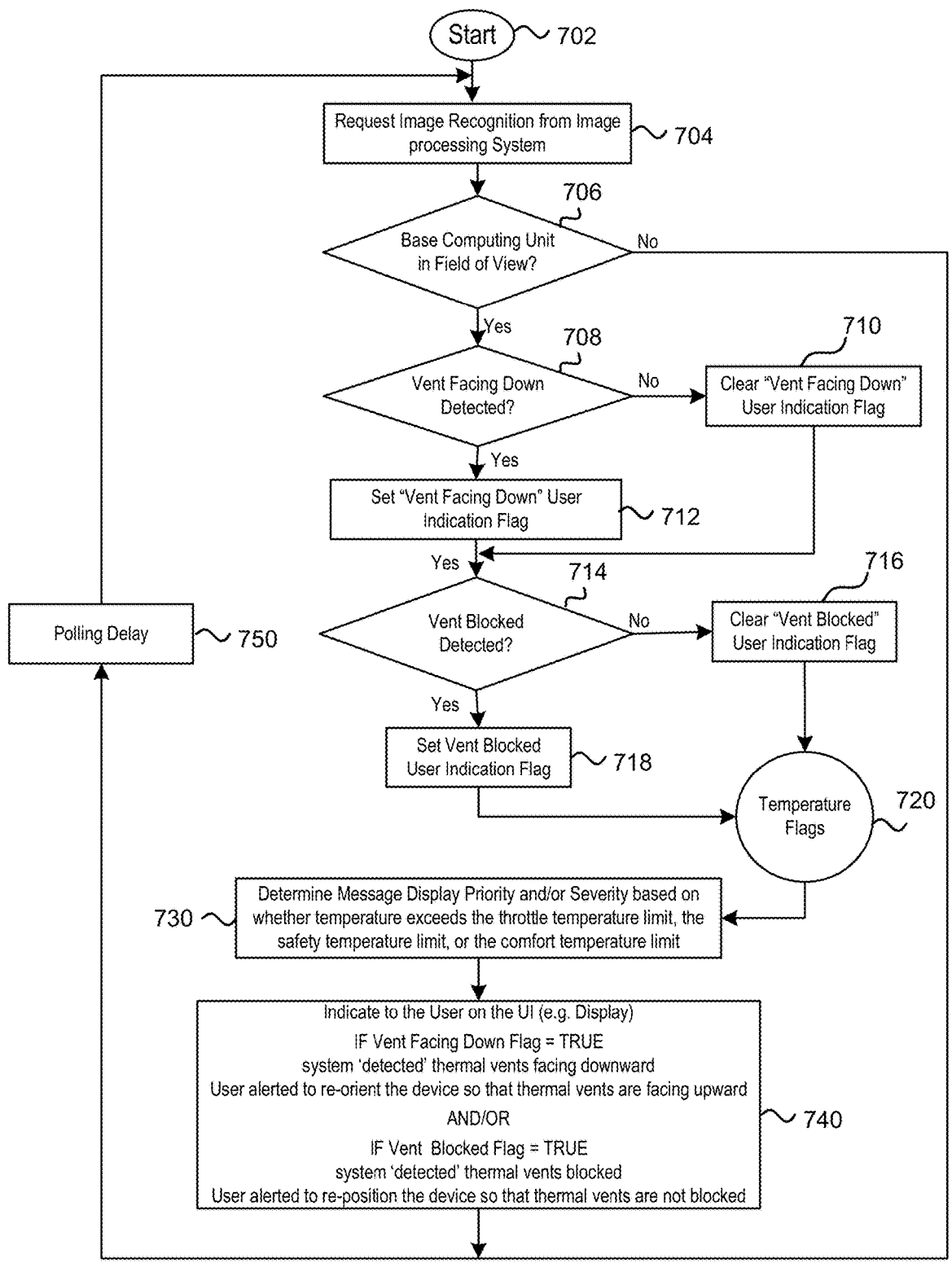
FIG. 7 is a simplified flowchart illustrating a method for improving efficiency of a thermal cooling system for a computing device using image sensing and image recognition according some embodiments of the present invention.

FIG. 7 is a simplified flowchart illustrating a method for improving efficiency of a thermal cooling system for a computing device using image sensing and image recognition according some embodiments of the present invention. This method assumes that the computing device does not include any proximity sensors or orientation sensors. The system may periodically poll an image sensing system to detect any thermal management problem, such as the thermal vents being blocked or facing downward. The image sensing system may include an image sensor, such as a camera, and an image processor for processing images acquired by the image sensor. The image sensor may be mounted on a user interface, such as a headset of a virtual reality (VR) or augmented reality (AR) system. The computing device may be the base computing unit of the VR/AR system. The method may start at 702. The system may request the image processor to perform image recognition of the images acquired by the image sensor (704). In some examples, the system may proceed from 702 to 704 in response to having determined that the temperature of the computing device and/or the temperature of the environment of the computing device have risen such that one or more thresholds are satisfied. As such, implementation of this logic in the system may serve to yield additional power savings.

The system may determine through image recognition whether the computing device is in the field of view of the image sensor (706). More specifically, in some embodiments, the system may determine at 706 whether the side or portion of the computing device on which the vent is disposed is at least partially in the field of view of the image sensor. If it is determined at 706 that the computing device or the relevant portion thereof is not in the field of view of the image sensor (e.g., as a result of the computing device being covered by a blanket or a piece of clothing, or the thermal vent being blocked from the field view by an object, etc.), the system may loop back to continue polling the image sensing system. If it is determined at 706 that the computing device is in the field of view, the system may proceed to determine through image recognition whether the thermal vents are facing downward (708).

If it is determined at 708 that the thermal vents are not facing downward, the system may clear the "vents facing down" user indication flag if it is not already cleared (710). If it is determined that the thermal vents are facing downward, the system may set the "vents facing down" user indication flag (712), so as to initiate sending feedback signals to the user to alert the user of the situation.

The system may then proceed to determine through image recognition whether the thermal vents are blocked by any object (714). If it is determined that the thermal vents are not blocked, the system may clear the "vent blocked" user indication flag if it is not already cleared (716). If it is determined at 714 that the thermal vents are blocked, the system may set the "vent blocked" user indication flag (718), so as to initiate sending feedback signals to the user to alert the user of the situation.

The system may then proceed to set the temperature flags (720), as discussed above in relation to FIG. 5. After the temperature flags have been set, the system may determine the appropriate feedback signals (e.g., displaying text and/or images, audio and haptic signals, etc.) to be sent to the user (730), based on what threshold temperatures (e.g., the throttle temperature threshold, the comfort temperature threshold, the safety temperature threshold) have been exceeded. The system may then proceed to send the feedback signals to the user through the user interface (740).

The feedback signals may include temperature indications, as well as indications of what may have caused the problem. For example, in a case where it is determined that the thermal vents are facing downward, the system may display a text message or a graphics image indicating that the thermal vents are facing downward and alert the use to re-orient the computing device so that the thermal vents are not facing downward. In a case where it is determined that the thermal vents are blocked, the system may display a text message or a graphics image indicating that the thermal vents are blocked and alert the use to re-position the computing device so that the thermal vents are no longer blocked. The system may then loop back to 704 to continue polling the imaging system. Note that image sensing and image recognition can provide a more definitive determination that the thermal vents are actually blocked or are facing downward. Thus, the feedback message may say that the system "has detected" such a condition, instead of saying that the system merely "thinks" that such a condition exists.

In some embodiments, the system may impose a polling delay between consecutive polling events (750). The delay period may be configured such that the system does not unduly tax the computing system. The delay period may be predetermined, or may be adaptively determined in real-time depending on whether a thermal management issue has been detected and/or the severity of the issue. For example, if the temperature sensors have detected that the temperature of the processor has exceeded the throttle threshold temperature, the system may set the polling delay to 5 seconds; on the other hand, if the temperature sensors have detected that the surface temperature of the computing device has exceeded the comfort threshold temperature, the system may set the polling delay to 1 second. Other factors may influence polling delay, such as battery life remaining; one of skill in art will appreciate many variations to the listed delays.

It should be appreciated that the specific steps illustrated in FIG. 7 provide a particular method for improving efficiency of a thermal cooling system for a computing device using image sensing and image recognition according to some embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the system may monitor thermal management issues by periodically polling the image processing unit. The polling frequency may depend on the processor temperatures and/or the surface temperatures of the computing device as measured by the temperature sensors. If the temperature is below any of the predetermined threshold temperatures (e.g., throttle threshold temperature, comfort threshold temperature, and safety threshold temperature), the thermal management processing unit may not poll the image processing unit at all. If the temperature is above any of the predetermined threshold temperatures, the thermal management processing unit may start polling the image processing unit. In some embodiments, the polling frequency may depend on the severity of the problem. For example, it may poll less frequently when only the throttle threshold temperature has been exceeded, and more frequently when the comfort threshold temperature or the safety threshold temperature has been exceeded.

Figure 8:
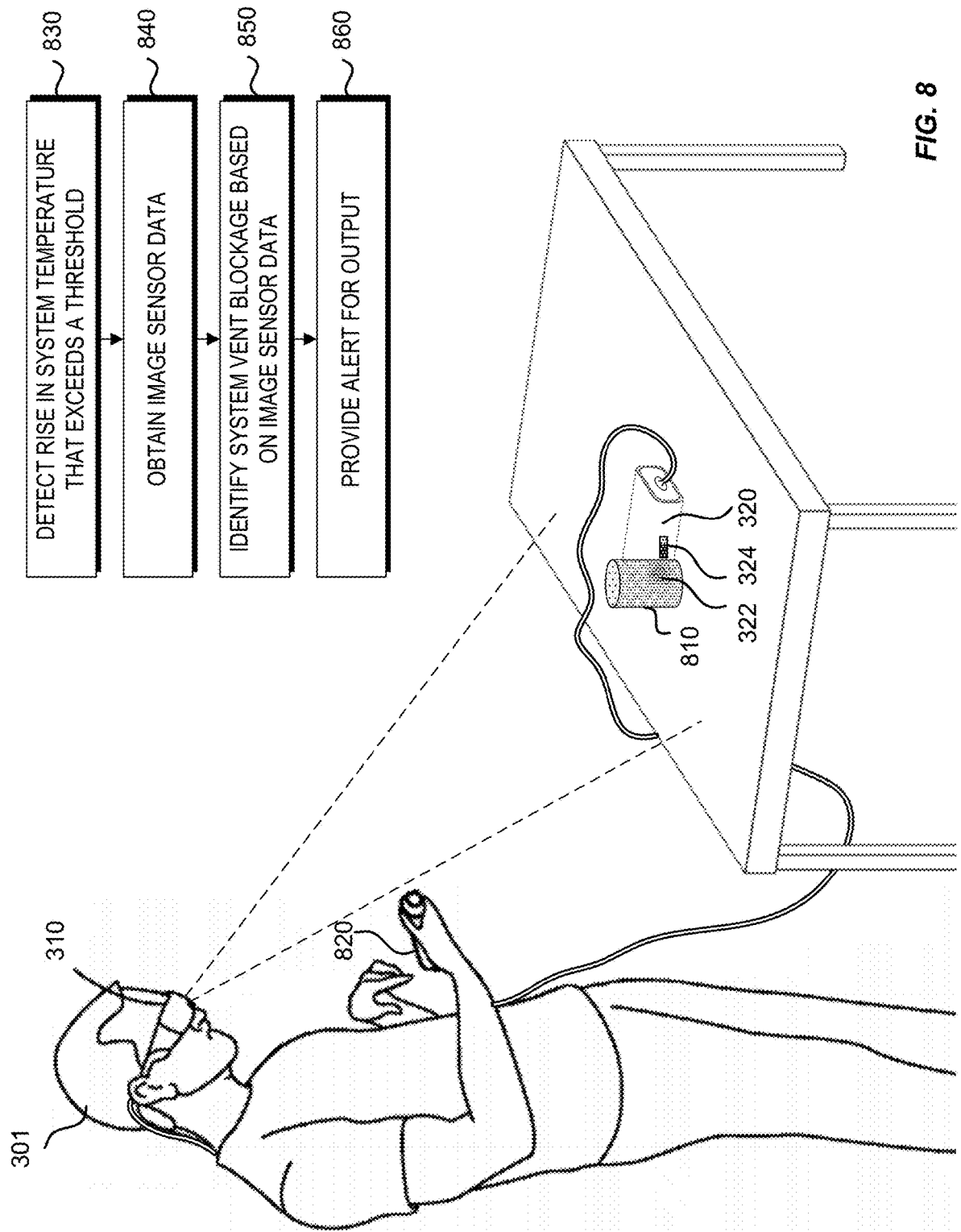
FIG. 8 illustrates an exemplary use case of a method for improving efficiency of a thermal cooling system for a computing device according to some embodiments.

FIG. 8 illustrates an exemplary use case according to some embodiments. As illustrated, a user 301 is using a computing system, such as an augmented reality or virtual reality system. The computing system includes a first electronic device 310 and a second electronic device 320, similar to the computing system illustrated in FIG. 3A. The first electronic device 310 is a headset worn around the user's eyes. The second electronic device 320 is a computing device, which is set on a table in this example. As illustrated, an object 810 is blocking the thermal vent 322 of the computing device 320, but the proximity sensor 324 may not detect any object adjacent the thermal vent 322. On the other hand, at 830, the readings of a temperature sensor may indicate that the temperature of the computing device 320 (internal temperature and/or surface temperature) is rising and may have exceeded a threshold temperature. In response to detecting the rising temperature, the system may, at 840 and 850, poll the image sensors mounted on the headset 310 and the image processing unit of the computing device 320 to confirm that the thermal vent 322 is actually blocked by the object 810, provided that the thermal vent is within the field of view (FOV) of the image sensors (e.g., as steps 704, 706, and 714 in FIG. 7). The system may then, at 860, send a feedback signal to the user 301 to inform the user that the thermal vent 322 is blocked, and to alert the user to re-position the computing device 320 or move the object 810 away from the thermal vent 322 for better thermal performance. For instance, light representing a virtual alert may be projected by the headset 310 toward the user's eye(s) such that the computing device 320, the object 810 blocking the vent 322, and/or the region surrounding the computing device 320 is augmented with 3D virtual indicia (e.g., arrow pointing toward blockage, textual notification, etc.). In another example, visual, audible, and/or haptic/tactile feedback may be provided by way of a smartphone, a totem 820 (as depicted as being held in the hand of the user 301 in FIG. 8), or other peripheral device. In yet another example, one or more user interface components housed within the computing device 320 (e.g., speaker, LEDs, etc.) may be activated.

Figure 9:
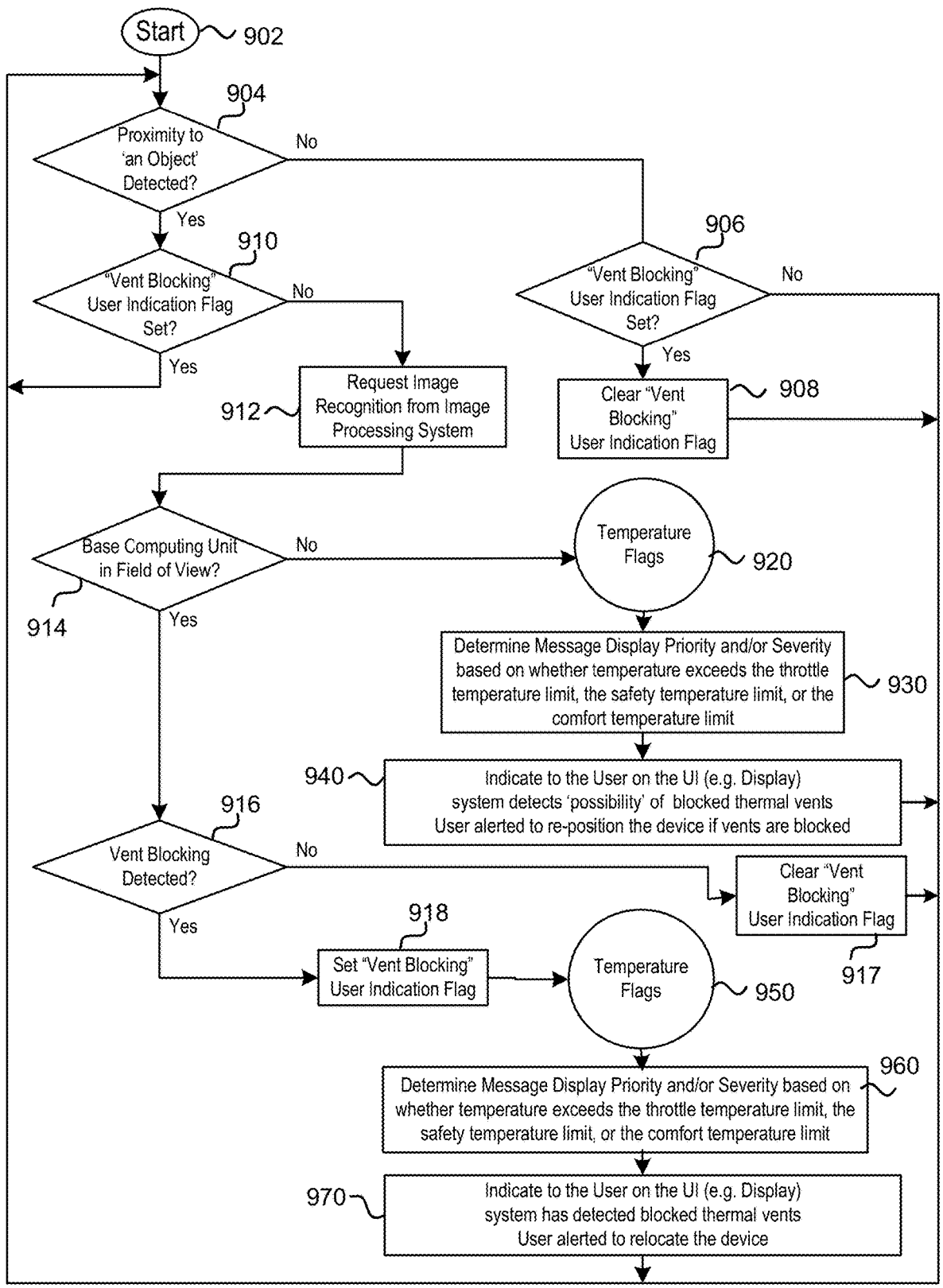
FIG. 9 is a simplified flowchart illustrating a method for improving efficiency of a thermal cooling system for a computing device using proximity sensing in combination with image sensing according some embodiments of the present invention.

FIG. 9 is a simplified flowchart illustrating a method for improving efficiency of a thermal cooling system for a computing device using proximity sensing in combination with image sensing according some embodiments of the present invention. The method starts at 902. The system may monitor the readings of one or more proximity sensors to determine whether there is an indication that thermal vents are blocked by an object (904).

If it is determined at 904 that there is no indication that the thermal vents are blocked by an object, the system may check if the "vent blocked" user indication flag has been set (906). If it is determined at 906 that the "vent blocked" user indication flag has not been set, the system may loop back to 904 to continue monitoring the readings of the proximity sensors. If it is determined at 906 that the "vent blocked" user indication flag is set, the system may clear the "vent blocked" user indication flag (908), so as to stop sending the user feedback signals. The system may then loop back to 904 to continue monitoring the readings of the proximity sensors.

If it is determined at 904 that there is an indication that thermal vents may be blocked by an object (e.g., as a result of the computing device being positioned inside a pocket or purse, against furniture or another surface, under textiles or other items, etc.), the system may check whether the "vent blocked" user indication flag has been set (910). If it is determined that the "vent blocked" user indication flag has already been set, the system may loop back to 904 to continue monitoring the readings of the proximity sensors without setting the "vent blocked" user indication flag again.

If it is determined at 910 that the "vent blocked" user indication flag has not been set, the system may proceed to request image recognition from an image processing system (912). Thus, the proximity sensors may serve as a "first line of defense" to detect a possibility that the thermal vents may be blocked, and the image processing system may serve to confirm whether the thermal vents are actually blocked by an object. The image sensing system may include an image sensor, such as a camera, and an image processor for processing images acquired by the image sensor. The image sensor may be mounted on a user interface, such as a headset of a virtual reality (VR) or augmented reality (AR) system. The computing device may be the base computing unit of the VR/AR system.

The system may determine through image recognition whether the computing device is in the field of view of the image sensor (914). If it is determined that the computing device is not in the field of view of the image sensor (e.g., as a result of the computing device being covered by a blanket or a piece of clothing, or the thermal vent being blocked from the field view by an object, etc.), the system may proceed to set the temperature flags (920), as described above in relation to FIG. 5. Thus, temperature sensing may serve as a backup check of the presence and/or the severity of any thermal management issues when the computing device is not in the field of view of the image sensor. After the temperature flags have been set at 930, the system may determine the appropriate feedback signals (e.g., displaying text and/or images, audio and haptic signals, etc.) to be sent to the user (930), based on what threshold temperatures (e.g., the throttle temperature threshold, the comfort temperature threshold, the safety temperature threshold) have been exceeded, as described above. The system may then send the feedback signals to the user through the user interface (940). For example, the system may display a text message or a graphics image indicating that there is a "possibility" that the thermal vents are blocked, and alert the use to re-position the device so that the thermal vents are not blocked. If the surface temperature has exceeded the safety threshold temperature, the system may display a severe warning, such as turning the entire display red. The system may then loop back to 904 to continue monitoring the readings of the proximity sensors.

If the system determines at 914 that the computing device is in the field of view of the image sensor, the system may determine through image recognition whether the thermal vents are indeed blocked (916). If it is determined at 916 that the thermal vents are actually not blocked, the system may proceed to clear the "vent blocking" user indication flag (917). If it is determined at 916 that the thermal vents are indeed blocked, the system may set the "vent blocking" user indication flag (918), so as to initiate sending feedback signals to the user to alert the user of the situation.

The system may also proceed to set the temperature flags (950), as described above in relation to FIG. 5. After the temperature flags have been set, the system may determine the appropriate feedback signals (e.g., displaying text and/or images, audio and haptic signals, etc.) to be sent to the user (960), based on what threshold temperatures (e.g., the throttle temperature threshold, the comfort temperature threshold, the safety temperature threshold) have been exceeded, as described above. The system may then send the feedback signals to the user through the user interface (970). For example, the system may display a text message or a graphics image indicating that the system "has detected" that the thermal vents are blocked, and alert the user to re-position the device so that the thermal vents are not blocked. In this case, the system has confirmed through image recognition that the thermal vents are indeed blocked. Therefore, the message may say the system "has detected" thermal vents being blocked, instead of merely has detected "possibility" of thermal vents being blocked. If the surface temperature has exceeded the safety threshold temperature, the system may display a severe warning, such as turning the entire display red. The system may then loop back to 904 to continue monitoring the readings of the proximity sensors.

It should be appreciated that the specific steps illustrated in FIG. 9 provide a particular method for improving efficiency of a thermal cooling system for a computing device using proximity sensing in combination with image sensing according to some embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
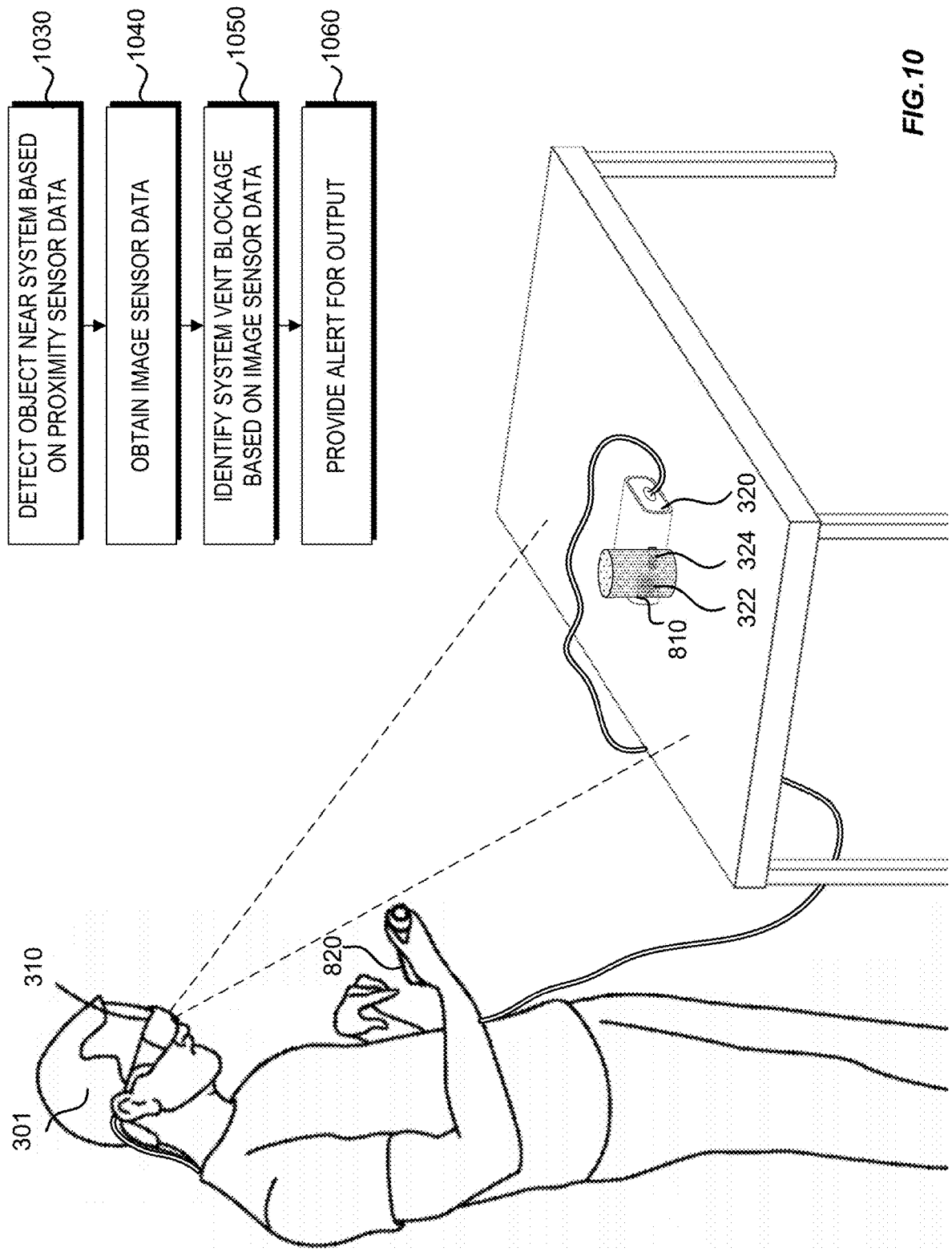
FIG. 10 illustrates an exemplary use case of a method for improving efficiency of a thermal cooling system for a computing device according to some embodiments.

FIG. 10 illustrates an exemplary use case according to some embodiments. Similar to FIG. 8, a user 301 is using a computing system, such as an augmented reality or virtual reality system, which includes a headset 310 worn around the user's eyes and a computing device 320 set on a table. As illustrated, at 1030, the proximity sensor 324 may detect the object 810 adjacent the thermal vent 322 (as step 902 in FIG. 9). In response to detecting the object 810 by the proximity sensor 324, the system may, at 1040, request image acquisition from the image sensors mounted on the headset 310, and at 1050, request image recognition from the image processing system to confirm that the thermal vent 322 is blocked by the object 810 (e.g., as steps 910, 912, 914, and 916 in FIG. 9). When it is confirmed from the image sensor data that the thermal vent 322 is indeed blocked by the object 810, the system may, at 1060, send a feedback signal to the user 301 to inform the user that the thermal vent 322 is blocked, and to alert the user to re-position the computing device 320 or move the object 810 away from the thermal vent 322 for better thermal performance. For instance, light representing a virtual alert may be projected by the headset 310 toward the user's eye(s) such that the computing device 320, the object 810 blocking the vent 322 of the computing device 320, and/or the region surrounding the computing device 320 is augmented with 3D virtual indicia (e.g., arrow pointing toward blockage, textual notification, etc.). In another example, visual, audible, and/or haptic/tactile feedback may be provided by way of a smartphone, a totem 820 (as depicted as being held in the hand of the user 301 in FIG. 8), or other peripheral device. In yet another example, one or more user interface components housed within the computing device 320 (e.g., speaker, LEDs, etc.) may be activated.

Figure 11:
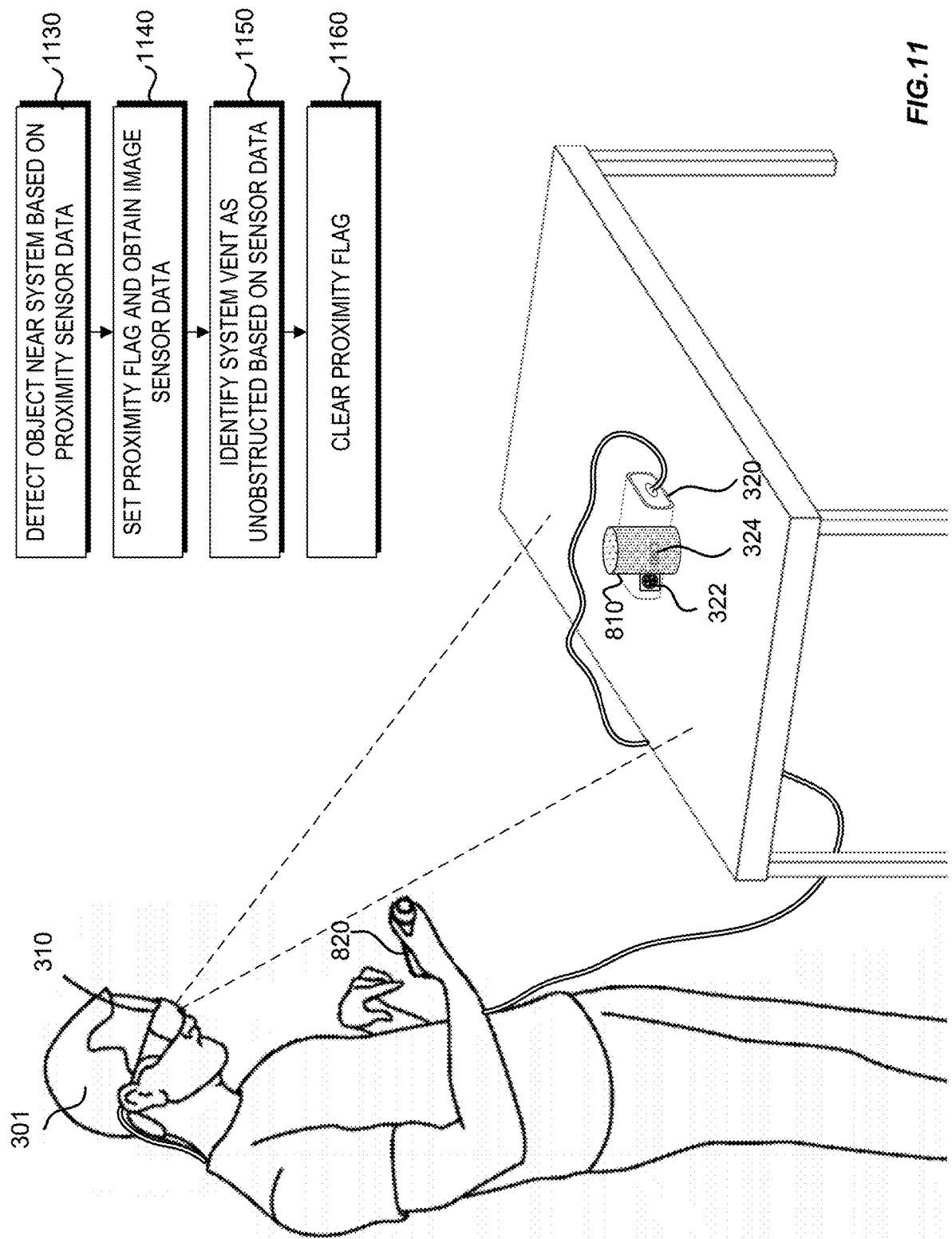
FIG. 11 illustrates another exemplary use case of a method for improving efficiency of a thermal cooling system for a computing device according to some embodiments.

FIG. 11 illustrates yet another exemplary use case according to some embodiments. Similar to FIG. 10, a user 301 is using a computing system, such as an augmented reality or virtual reality system, which includes a headset 310 worn around the user's eyes and a computing device 320 set on a table. As illustrated, at 1130, the proximity sensor 324 may detect the object 810 adjacent the thermal vent 322 (e.g., as step 902 in FIG. 9). In response to detecting the object 810, the system may, at 1140, request image acquisition from the image sensors mounted on the headset 310, and at 1150, request image recognition from the image processing system to confirm whether the thermal vent 322 is blocked by the object 810 (as steps 910, 912, 914, and 916 in FIG. 9). In this case, the image sensor data indicate that the thermal vent is actually not blocked. Thus, the system may, at 1160, clear the "vent blocking" user indication flag so as not to send any feedback signals to the user (e.g., as step 917 in FIG. 9).

FIG. 12 illustrates yet another exemplary use case according to some embodiments. Similar to FIG. 10, a user 301 is using a computing system, such as an augmented reality or virtual reality system, which includes a headset 310 worn around the user's eyes and a computing device 320 set on a table. As illustrated, at 1230, the proximity sensor 324 may detect the object 810 adjacent the thermal vent 322 (e.g., as step 902 in FIG. 9). In response to detecting the object 810, the system may, at 1240, request image acquisition from the image sensors mounted on the headset 310, and at 1250, request image recognition from the image processing system to confirm whether the thermal vent 322 is blocked by the object 810 (e.g., as steps 910, 912, 914, and 916 in FIG. 9). However, in this case the thermal vent 322 is blocked from the field of view of the image sensors by the books 830. Therefore, the imaging system is not able to confirm whether or not the thermal vent 322 is actually blocked. This scenario may also happen when the computing device is covered or partially covered by a blanket or a piece of clothing. In such situations, the system may still send a feedback signal to the user to alert the user the "possibility" that the thermal vent may be blocked, as described above in relation to FIG. 4 (e.g., as step 440).

Figure 13:
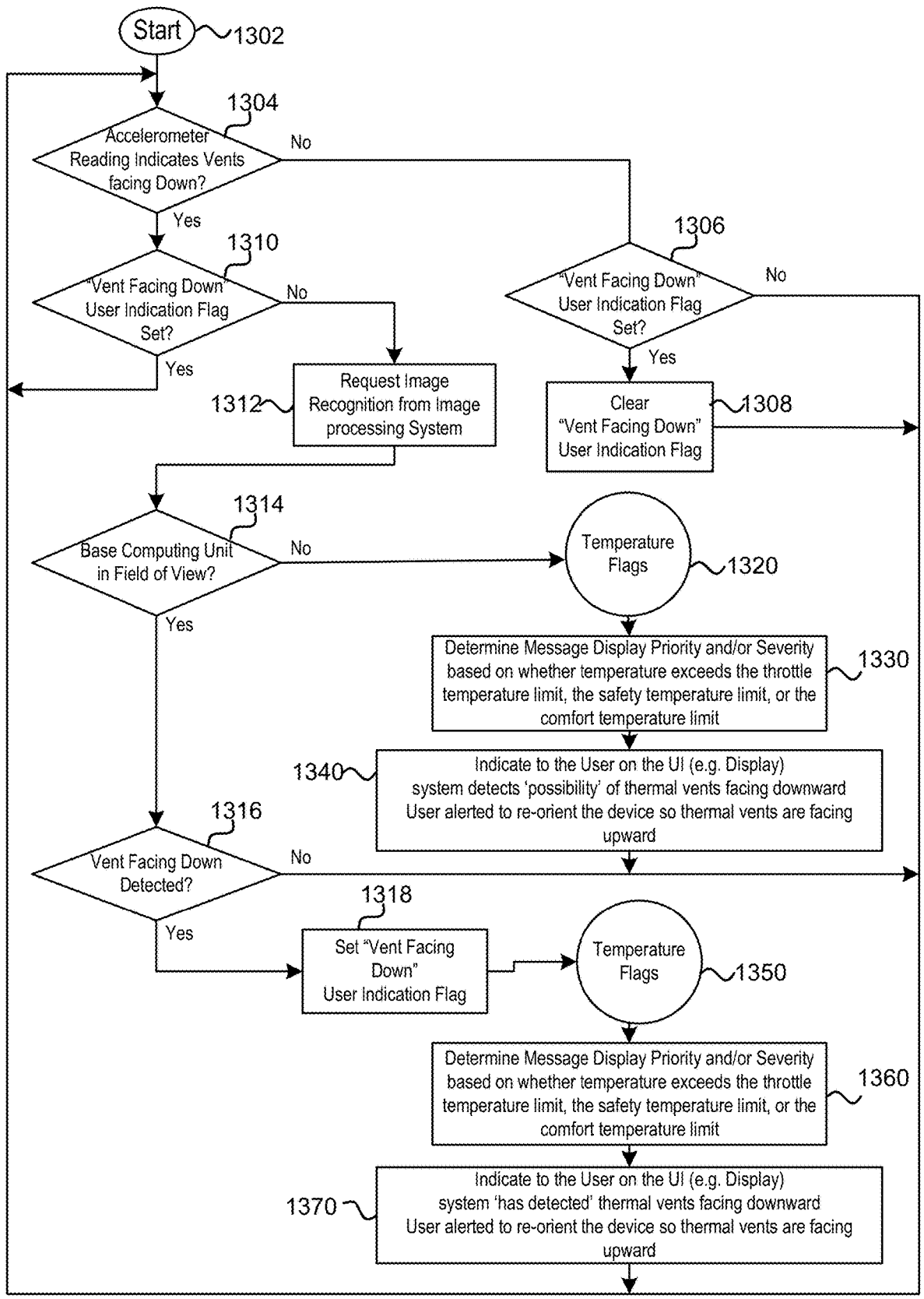
FIG. 13 is a simplified flowchart illustrating a method for improving efficiency of a thermal cooling system for a computing device using orientation sensing in combination with image sensing according some embodiments of the present invention.

FIG. 13 is a simplified flowchart illustrating a method for improving efficiency of a thermal cooling system for a computing device using orientation sensing in combination with image sensing according some embodiments of the present invention. The method starts at 1302. The system may monitor the readings of one or more orientation sensors (e.g., accelerometers and gyroscopes) to determine whether there is any indication that the thermal vents are facing downward (1304).

If it is determined at 1304 that there is no indication that the thermal vents are facing downward, the system may check if the "vent facing down" user indication flag has been set (1306). If it is determined at 1306 that the "vent facing down" user indication flag has not been set, the system may loop back to 1304 to continue monitoring the readings of the orientation sensors. If it is determined at 1306 that the "vent facing down" user indication flag is set, the system may clear the "vent facing down" user indication flag (1308), so as to stop sending the user feedback signals. The system may then loop back to 1304 to continue monitoring the readings of the orientation sensors.

If it is determined at 1304 that there is an indication that the thermal vents may face downward, the system determines whether a "vent facing down" user indication flag has been set (1310). If it is determined that the "vent facing down" user indication flag has already been set, the system may loop back to 1304 to continue monitoring the readings of the orientation sensors without setting the "vent facing down" user indication flag again.

If it is determined at 1310 that the "vent facing down" user indication flag has not been set, the system may proceed to request image recognition from an image processing system (1312). Thus, the orientation sensors may serve as a "first line of defense" to detect a possibility that the thermal vents may be facing downward, and the image processing system may serve to confirm that the thermal vents are indeed facing downward. The image sensing system may include an image sensor, such as a camera, and an image processor for processing images acquired by the image sensor. The image sensor may be mounted on a user interface, such as a headset of a virtual reality (VR) or augmented reality (AR) system. The computing device may be the base computing unit of the VR/AR system.

The system may determine through image recognition whether the computing device is in the field of view of the image sensor (1314). If it is determined that the computing device is not in the field of view of the image sensor, the system may proceed to set the temperature flags (1320), as described above in relation to FIG. 5. Thus, temperature sensing may serve as a backup check of the presence and/or the severity of any thermal management issues when the computing device is not in the field of view of the image sensor. After the temperature flags have been set at 1330, the system may determine the appropriate feedback signals (e.g., displaying text and/or images, audio and haptic signals, etc.) to be sent to the user (1330), based on what threshold temperatures (e.g., the throttle temperature threshold, the comfort temperature threshold, the safety temperature threshold) have been exceeded, as described above. The system may then send the feedback signals to the user through the user interface (1340). For example, the system may display a text message or a graphics image indicating that there is a "possibility" that the thermal vents are facing downward, and alert the use to re-orient the device so that the thermal vents are not facing downward. The system may then loop back to 1304 to continue monitoring the readings of the orientation sensors.

If the system determines at 1314 that the computing device is in the field of view of the image sensor, the system may determine through image recognition whether the thermal vents are facing downward (1316). If it is determined at 1316 that the thermal vents are actually not facing downward, the system may loop back to 1304 to continue monitoring the readings of the orientation sensors. If it is determined at 1316 that the thermal vents are indeed facing downward, the system may set the "vent facing down" user indication flag (1318), so as to initiate sending feedback signals to the user to alert the user of the situation.

The system may also proceed to set the temperature flags (1350), as described above in relation to FIG. 5. After the temperature flags have been set, the system may determine the appropriate feedback signals (e.g., displaying text and/or images, audio and haptic signals, etc.) to be sent to the user (1360), based on what threshold temperatures (e.g., the throttle temperature threshold, the comfort temperature threshold, the safety temperature threshold) have been exceeded, as described above. The system may then send the feedback signals to the user through the user interface (1370). For example, the system may display a text message or a graphics image indicating that the system "has detected" that the thermal vents are facing downward, and alert the user to re-orient the device so that the thermal vents are not blocked. In this case, the system has confirmed through image recognition that the thermal vents are indeed facing downward, beyond a mere "possibility." The system may then loop back to 1304 to continue monitoring the readings of the proximity sensors.

It should be appreciated that the specific steps illustrated in FIG. 13 provide a particular method for improving efficiency of a thermal cooling system for a computing device using orientation sensing in combination with image sensing according to some embodiments of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

According to some embodiments, a method for improving efficiency of a thermal cooling system for a computing device may combine proximity sensing, orientation sensing, and image sensing, in effect combining the methods described above in relation to FIGS. 9 and 13. In an event where the readings of the proximity sensors indicate that the thermal vents are blocked, and the readings of the orientation sensors indicate that the thermal vents are facing downward, the system may send a consolidated feedback signal alerting the reader to both re-position and re-orient the computing device so that the thermal vents are not blocked and are not facing downward.

Although primarily described within the context of augmented reality, mixed reality, and virtual reality systems, it is to be understood that the systems and techniques described herein may be applied in systems that are leveraged in other settings, involve other types of devices, execute other types of operations, or a combination thereof. For example, the techniques described herein may be applied in systems and scenarios involving smartphones, tablets, laptops, smartwatches, smart garments/textiles and other wearable devices, dongles, desktop computers, appliances, and the like. In some embodiments, one or more of the systems and techniques described herein may be applied in a particular computing system to detect, identify, and/or address thermal management issues that arise in one or more devices that are external to the particular computing system. For instance, one or more of the systems and techniques described herein may be applied in a mobile computing device so as to enable the mobile computing device to facilitate the detection, identification, and/or remediation of thermal management issues that may arise in a nearby smart appliance.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   detecting a condition indicating an object is in proximity to a thermal vent of a cooling system of a computing device using a proximity sensor positioned adjacent the thermal vent;
   acquiring an image of the computing device using an image sensor in response to detecting the condition indicating the object is in proximity to the thermal vent of the cooling system;
   processing the image to confirm that the thermal vent is blocked by the object; and
   outputting an alert through one or more user interface components in response to confirming that the thermal vent is blocked by the object.

2. The method of claim 1 wherein outputting the alert through one or more user interface components comprises one or more of: (i) displaying a message or an image indicating that the thermal vent is blocked; (ii) turning on an indication light; (iii) generating an audio signal; or (iv) generating a vibration signal.

3. The method of claim 1 wherein the alert comprises a visual signal prompting a user to re-position the computing device so that the thermal vent is not blocked.

4. The method of claim 1 further comprising:
   detecting an internal temperature of the computing device using one or more temperature sensors; and
   in response to determining that the internal temperature is above a throttling threshold temperature, outputting an alert through the one or more user interface components indicating that the internal temperature of the computing device has exceeded the throttling threshold temperature.

5. The method of claim 4 further comprising:
   detecting a surface temperature of the computing device using the one or more temperature sensors; and
   in response to determining that the surface temperature is above a comfort threshold temperature or a safety threshold temperature, outputting an alert through the one or more user interface components indicating that surface temperature of the computing device has exceeded the comfort threshold temperature or the safety threshold temperature.

6. A method comprising:
   detecting a condition indicating that an orientation of a computing device is such that a thermal vent of a cooling system of the computing device is facing downward using an orientation sensor coupled to the computing device;
   acquiring an image of the computing device using an image sensor in response to detecting the condition indicating that the orientation of the computing device is such that the thermal vent of the cooling system of the computing device is facing downward;
   processing the image to confirm that the thermal vent is facing downward; and
   outputting an alert through one or more user interface components indicating that the thermal vent is facing downward.

7. The method of claim 6 wherein outputting the alert through the one or more user interface components comprises one or more of: (i) displaying a message or an image indicating that the thermal vent is facing downward; (ii) turning on an indication light; (iii) generating an audio signal; or (iv) generating a vibration signal.

8. The method of claim 6 wherein the alert comprises a visual signal prompting a user to re-position the computing device so that the thermal vent is not facing downward.

9. The method of claim 6 further comprising:
   detecting an internal temperature of the computing device using one or more temperature sensors; and
   in response to determining that the internal temperature is above a throttling threshold temperature, outputting an alert through the one or more user interface components indicating that the internal temperature of the computing device has exceeded the throttling threshold temperature.

10. The method of claim 9 further comprising:
    detecting a surface temperature of the computing device using the one or more temperature sensors; and
    in response to determining that the surface temperature is above a comfort threshold temperature or a safety threshold temperature, outputting an alert through the one or more user interface components indicating that surface temperature of the computing device has exceeded the comfort threshold temperature or the safety threshold temperature.

11. A computing system comprising:
    a physical housing structure;
    a thermal cooling system including at least one thermal vent for dissipating heat away from the physical housing structure;
    at least one sensor configured to monitor one or more operating conditions of the thermal cooling system;
    an image sensor; and
    a plurality of electronic hardware components, at least a portion of which are contained within or attached to the physical housing structure, the plurality of electronic hardware components comprising:
       at least one user interface component; and
       at least one processor communicatively coupled to the image sensor, the at least one sensor and the at least one user interface component, the at least one processor configured to:
          obtain output data from the at least one sensor;
          determine whether the output data obtained from the at least one sensor indicates that the thermal cooling system is subject to one or more operating conditions that impede dissipation of heat away from the physical housing structure;
          in response to determining that the output data obtained from the at least one sensor indicates that the thermal cooling system is subject to the one or more operating conditions, cause the image sensor to acquire an image of the physical housing structure;
          process the image to confirm that the thermal cooling system is subject to the one or more operating conditions; and
          provide one or more alerts for output through the at least one user interface component in response to confirming that the thermal cooling system is subject to the one or more operating conditions.

12. The computing system of claim 11, wherein:
    the at least one sensor comprises a proximity sensor configured to monitor the at least one thermal vent's proximity to physical objects located external from the physical housing structure; and
    determining whether the output data obtained from the at least one sensor indicates that the thermal cooling system is subject to the one or more operating conditions comprises determining whether the output data obtained from the proximity sensor indicates that the at least one thermal vent is closer than a threshold distance away from one or more physical objects.

13. The computing system of claim 11, wherein:
the at least one sensor comprises an orientation sensor configured to monitor the at least one thermal vent's orientation relative to an environment within which the thermal cooling system is located; and
determining whether the output data obtained from the at least one sensor indicates that the thermal cooling system is subject to the one or more operating conditions comprises determining whether the output data obtained from the orientation sensor indicates that the at least one thermal vent is facing downward.

14. The computing system of claim 11, wherein the at least one processor belongs to the portion of the plurality of electronic hardware components that are contained within or attached to the physical housing structure.

15. The computing system of claim 14, wherein the at least one user interface component does not belong to the portion of the plurality of electronic hardware components that are contained within or attached to the physical housing structure.

16. The computing system of claim 14, wherein the at least one user interface component belongs to the portion of the plurality of electronic hardware components that are contained within or attached to the physical housing structure.

17. The computing system of claim 11, wherein the physical housing structure and the portion of the plurality of electronic hardware components that are contained within or attached to the physical housing structure collectively function as an electronic device.

18. The computing system of claim 11, wherein the at least one processor is communicatively coupled to the at least one sensor through a channel of a wireless communication network.

19. The computing system of claim 18, wherein the at least one processor is communicatively coupled to the at least one user interface component through the channel of the wireless communication network.

20. The computing system of claim 18, wherein the at least one processor is communicatively coupled to the at least one user interface component through another, different channel of the wireless communication network.

* * * * *